United States Patent
Munday et al.

(10) Patent No.: US 7,686,309 B2
(45) Date of Patent: Mar. 30, 2010

(54) HYDRAULIC SYSTEM FOR A VEHICLE SUSPENSION

(75) Inventors: Raymond Andrew Munday, Busselton (AU); James Lind Taylor, Menora (AU); Richard Monk, Busselton (AU)

(73) Assignee: Kinetic Pty. Ltd., Dunsburough (AU)

( * ) Notice: Subject to any disclaimer, the term of this patent is extended or adjusted under 35 U.S.C. 154(b) by 219 days.

(21) Appl. No.: 11/658,519

(22) PCT Filed: Jul. 29, 2005

(86) PCT No.: PCT/AU2005/001130

§ 371 (c)(1),
(2), (4) Date: Jan. 25, 2007

(87) PCT Pub. No.: WO2006/010226

PCT Pub. Date: Feb. 2, 2006

(65) Prior Publication Data

US 2008/0129000 A1 Jun. 5, 2008

(30) Foreign Application Priority Data

Jul. 30, 2004 (AU) .............................. 2004904240

(51) Int. Cl.
*B60G 21/06* (2006.01)
*B60G 17/016* (2006.01)
(52) U.S. Cl. .............. 280/5.507; 280/5.504; 280/5.506; 280/5.513; 701/38
(58) Field of Classification Search ................. 280/5.5, 280/5.506, 5.504, 5.507, 5.513, 124.157, 280/124.16; 701/37, 38
See application file for complete search history.

(56) References Cited

U.S. PATENT DOCUMENTS 5,447,332 A * 9/1995 Heyring ............... 280/124.104

(Continued)

FOREIGN PATENT DOCUMENTS

AU 199670599 A1 5/1997

(Continued)

OTHER PUBLICATIONS

Supplementary European Search Report dated Apr. 2, 2009 in corresponding EP Application No. 05 76 8318.

*Primary Examiner*—Paul N Dickson
*Assistant Examiner*—Drew Brown
(74) *Attorney, Agent, or Firm*—Harness, Dickey & Pierce, P.L.C.

(57) ABSTRACT

A hydraulic system for a suspension system for a vehicle includes at least one first pair of wheel rams (11, 12) at a first end of the vehicle and at least one second pair of wheel rams (13, 14) at a second end of the vehicle, each rams including a compression chamber (45-48) and a rebound chamber (49-52); and the system includes first and second diagonal circuits with respect to said vehicle. The hydraulic system includes at least one first and second modal resilience devices (81, 82). These devices each including at least one resilient means (107-110), at least one moveable member (105-106) and at least first and second (89, 90 and 91, 92) system modal chambers. Motion of the moveable member of each modal resilience device due to roll or pitch motion of the vehicle is controlled by the respective at least one resilient means to thereby provide respective roll or pitch resilience in the system.

11 Claims, 13 Drawing Sheets

U.S. PATENT DOCUMENTS

| | | |
|---|---|---|
| 5,562,305 A | 10/1996 | Heyring et al. |
| 5,601,306 A * | 2/1997 | Heyring .................. 280/5.508 |
| 5,919,240 A * | 7/1999 | Ney et al. .................... 701/37 |
| 6,010,139 A | 1/2000 | Heyring et al. |
| 6,220,613 B1 * | 4/2001 | Franzini ............. 280/124.106 |
| 6,270,098 B1 | 8/2001 | Heyring et al. |
| 6,318,742 B2 | 11/2001 | Franzini |
| 6,338,014 B2 | 1/2002 | Heyring et al. |
| 2004/0169345 A1 | 9/2004 | Fontdecaba Buj |
| 2006/0237942 A1 * | 10/2006 | Munday et al. ....... 280/124.157 |
| 2008/0272561 A1 * | 11/2008 | Monk et al. .............. 280/5.507 |

FOREIGN PATENT DOCUMENTS

| | | |
|---|---|---|
| EP | 1 426 212 A2 | 6/2004 |
| WO | WO-2004/052667 A1 | 6/2004 |

* cited by examiner

HYDRAULIC SYSTEM FOR A VEHICLE SUSPENSION

CROSS REFERENCE TO RELATED APPLICATIONS

This application is a U. S. National Stage Application of International application No. PCT/AU2005/001130, filed 29 Jul. 2005. This application claims the benefit of Australian Application No. 2004904240, filed 30 Jul. 2004 The disclosures of the above applications are incorporated herein by reference.

TECHNICAL FIELD

The present invention is directed to suspension systems for vehicles, and in particular to a hydraulic system providing control of one or more suspension parameters.

BACKGROUND OF THE INVENTION

There are known many alternative interconnected suspension systems which have the ability to passively differentiate between different modes of wheel motion with respect to the vehicle body and therefore provide a variety of alternatives in functionality. For example, the Applicant's U.S. Pat. No. 6,270,098 provides a pressure balancing "load distribution" unit between two pairs of diagonally interconnected double acting wheel rams. This system provides different heave, roll and pitch stiffness rates with zero warp stiffness and different damping rates in all four base suspension modes (heave, roll, pitch and warp). This system supports the weight of the vehicle, so as the loads on the vehicle change, or as the fluid temperature changes, the volume of fluid in each of the six volumes in the system must be adjusted. Also, as the six volumes in the system can in some load conditions, all be at different pressures, there is the possibility for fluid to leak across seals, which also requires fluid volume adjustments to be made to maintain the correct vehicle attitude. This requires a high pressure fluid source, sensors, control electronics and valves, making the cost of the system relatively high for a passive system.

An example of a passive interconnected hydraulic system providing many of the benefits of the above (U.S. Pat. No. 6,270,098) without the cost of a high pressure control system can be found in the applicant's PCT/AU03/01637 (Australian patent application number 2003291836). This lower cost system can, in some embodiments, provide high roll stiffness with low warp stiffness, negligible heave stiffness and a different stiffness rate in pitch. It also provides high roll damping and pitch damping with lower, more comfortable and isolating heave damping. As this hydraulic system does not provide significant heave stiffness, separate support springs are required, giving the advantage that all six system volumes can operate at a common pressure, negating the need for a high pressure control system. However, when pitch stiffness is provided, the system has six volumes, a single load distribution unit which requires two accumulators and can be difficult to package, or if split into two halves, requires additional hydraulic conduits in the vehicle. The layout of the conduits of the system can also give rise to fluid acceleration effects.

An example of a system having just roll and/or pitch damping can be found in U.S. Pat. No. 5,486,018 and U.S. Pat. No. 6,024,366. The system in each of these documents uses a device between a pair of wheel damping rams, each wheel damping ram having a damper valve in its piston to provide double-acting damping but make the ram single-acting (i.e. there is only one fluid port). The device provides for independent levels of damping for in-phase (i.e. heave) and out of phase (i.e. roll and/or pitch) motions. However this system does not provide significant stiffness in any mode, so in addition to the need for support springs, generally anti-roll bars will be required for a good balance between bounce and roll stiffness. Additionally, as the wheel rams are effectively single acting (having only one fluid port) the amount of damping that the device can provide is limited. There are improvements made to the system to combat this problem, which can be found in Japanese patent office publication number 11291737, but these add to the complexity of the system by providing more plumbing and spool valves.

With the aforementioned in mind, it is therefore an object of the present invention to provide a hydraulic system for a vehicle suspension that alleviates at least one of the disadvantages of such known vehicle suspension systems.

It is a preferred object of the present invention to provide a hydraulic system exhibiting roll stiffness, pitch stiffness, roll damping, pitch damping and heave damping, all of which can be configured and tuned substantially independently from each other to enable optimisation of each parameter.

SUMMARY OF THE INVENTION

With this in mind, one form of the present invention provides a hydraulic system for a suspension system for a vehicle, the vehicle including a vehicle body and at least one forward pair of wheel assemblies and at least one rearward pair of wheel assemblies, the hydraulic system including: at least one first pair of wheel rams at a first end of the vehicle, each ram thereof including a compression chamber and a rebound chamber, and at least one second pair of wheel rams at a second end of the vehicle, each ram thereof including a compression chamber and a rebound chamber; and wherein the system includes first and second diagonal circuits with respect to said vehicle, the first diagonal circuit interconnecting a first left wheel ram and a second right wheel ram, the compression chamber of each wheel ram being in fluid communication with the rebound chamber of the other wheel ram forming first and second fluid volumes:

the second diagonal circuit interconnecting a first right wheel ram and a second left wheel ram, the compression chamber of each wheel ram being in fluid communication with the rebound chamber of the other wheel ram forming first and second fluid volumes;

and wherein the hydraulic system includes at least one first modal resilience device and at least one second modal resilience device, the first and second modal resilience devices each including at least one resilient means, at least one moveable member and at least first and second system modal chambers, wherein the first modal resilience device has the first system modal chamber thereof connected in fluid communication with the first fluid volume of the first diagonal circuit forming a first diagonal first compression volume, the second system modal chamber thereof connected in fluid communication with the second fluid volume of the second diagonal circuit forming a second diagonal second compression volume, and the second modal resilience device has the first system modal chamber thereof connected in fluid communication with the first fluid volume of the second diagonal circuit forming a second diagonal first compression volume, and the second system modal chamber thereof connected in fluid communication with the second fluid volume of the first diagonal circuit forming a first diagonal second compression volume; and wherein motion of the moveable member of each modal resilience device due to roll or pitch motion of the vehicle is controlled by the respective at least one resilient means to thereby provide respective roll or pitch resilience in the system.

The hydraulic suspension system according to the present invention advantageously allows for the independent tuning and design of suspension parameters including pitch stiffness, pitch damping, roll stiffness, roll damping, and heave damping. This enables optimisation of a variety of these suspension parameters.

The present invention may advantageously provide enhanced control of pitch stiffness and/or roll stiffness determined by the chosen connectivity of the modal resilience means with the diagonal circuits. Pitch stiffness of the hydraulic system is preferably configured to be between zero pitch stiffness (with infinite resilience in the pitch resilience devices) to the maximum pitch stiffness possible (with zero resilience in the pitch resilience devices) depending on the form, construction and connection of the modal resilience devices in the system.

According to a further form of the present invention, the volume of the first and second system modal chambers of at least one said first and second modal resilience devices may vary with motion of the respective moveable member(s), said motion deforming, compressing or extending said at least one resilient means. More preferably, motion of the at least one moveable member of the first modal resilience device against the at least one modal resilience means thereof may permit effective fluid flow from the first diagonal first compression volume and simultaneously permits effective fluid flow either to or from the second diagonal second compression volume. Yet more preferably, motion of the at least one moveable member of the second modal resilience device against the at least one modal resilience means thereof may permit effective fluid flow from the second diagonal first compression volume and simultaneously permits effective fluid flow either to or from the first diagonal second compression volume. Thus, advantageously, the modal resilience means of each of the modal resilience devices may thereby provide controlled increased resilience during either the roll or pitch motions of the vehicle.

Preferably, for each modal resilience device, the volume of the first system modal chamber may vary in volume in the opposite direction to the volume of the second system modal chamber thereof with motion of the at least one moveable member, thereby, controlled effective fluid flow may be permitted between the associated first and second compression volumes.

Preferably, for each modal resilience device, the volume of the first system modal chamber may vary in volume in the same direction as the volume of the second system modal chamber thereof with motion of the at least one moveable member, thereby, controlled simultaneous effective fluid flow may be permitted out of both or into both of the associated first and second compression volumes.

Preferably, the first diagonal first compression volume and the second diagonal first compression volume may include compression chambers of wheel rams at the same end of the vehicle, such that the modal resilience device may be connected to provide additional pitch resilience to the hydraulic system.

Preferably, the first diagonal first compression volume and the second diagonal first compression volume may include compression chambers of wheel rams at the same side of the vehicle, such that the modal resilience device may be connected to provide additional roll resilience to the hydraulic system.

Preferably, the first diagonal first compression volume and the second diagonal first compression volume may include compression chambers of wheel rams at the same end of the vehicle, such that the modal resilience device may be connected to provide additional roll resilience to the hydraulic system.

Preferably, the first diagonal first compression volume and the second diagonal first compression volume may include compression chambers of wheel rams on the same side of the vehicle, such that the modal resilience device may be connected to provide additional pitch resilience to the hydraulic system.

A yet further form of the present invention provides a hydraulic system for a suspension system for a vehicle, the vehicle including a vehicle body and at least one forward pair of wheel assemblies and at least one rearward pair of wheel assemblies, the suspension system including front and rear resilient vehicle support means between the vehicle body and the wheel assemblies for resiliently supporting the vehicle above the wheel assemblies, the hydraulic system including: at least one first pair of wheel rams at a first end of the vehicle and at least one second pair of wheel rams at a second end of the vehicle; each of the at least one first pair of wheel rams at a first end of the vehicle including a compression chamber and a rebound chamber, thereby providing a first left compression chamber, a first left rebound chamber, a first right compression chamber and a first right rebound chamber; each of the at least one second pair of wheel rams including a compression chamber, thereby providing a second left compression chamber and a second right compression chamber; the first left rebound chamber being connected to the second right compression chamber and the first right rebound chamber being connected to the second left compression chamber; and wherein there is provided at least a first and a second pitch resilience device, each pitch resilience device including at least two pitch chambers and a moveable member, wherein motion of the moveable member is controlled by at least one resilient device, the two pitch chambers varying in volume inversely proportionally to each other with movement of the moveable member, the first pitch resilience device including a first left compression pitch chamber and a second left compression pitch chamber, the second pitch resilience device including a first right compression pitch chamber and a second right compression pitch chamber; the first left compression chamber being in fluid communication with the first left compression pitch chamber forming a first left compression volume, the second left compression chamber being in fluid communication with the second left compression pitch chamber, together with the first right rebound chamber forming a second left compression volume, the first right compression chamber being in fluid communication with the first right compression pitch chamber forming a first right compression volume, the second right compression chamber being in fluid communication with the second right compression pitch chamber, together with the first left rebound chamber forming a second right compression volume, such that suspension parameters provided by the hydraulic system can be independently tuned from each other.

There may be provided a pressure accumulator in fluid communication with at least one of the left compression volumes and/or a pressure accumulator in fluid communication with at least one of the right compression volumes.

The hydraulic suspension system according to the present invention allows for the independent tuning and design of suspension parameters including roll stiffness, roll damping, pitch stiffness, pitch damping and heave damping. This enables optimisation of a variety of these suspension parameters.

The vehicle may be primarily supported by the resilient vehicle support means. The vehicle support means may be any known support means such as coil springs, air springs, torsion bars, leaf springs and rubber cones. The vehicle support means can, in the case of coil springs and air springs, be mounted around the wheel rams or mounted separately.

Each of the at least one second pair of wheel rams at the second end of the vehicle may further include a rebound chamber, forming a second left rebound chamber and a second right rebound chamber, the second left rebound chamber being connected to the first right compression chamber and forming part of the first right compression volume and the second right rebound chamber being connected to the first left compression chamber and forming part of the first left compression volume.

Each pitch resilience device may comprise a single primary chamber divided by the moveable member to form the first and second compression pitch chambers, there being a first resilient device located in the first compression pitch chamber and there being a second resilient device located in the second compression pitch chamber.

The moveable member may be a piston, a diaphragm, or other type of similar device which can allow a change of fluid volume in the first and second compression pitch chambers whilst providing a seal such that there is substantially no fluid flow between the first and second compression pitch chambers.

The pitch resilience device may be a mechanical spring such as a coil spring or stack of Belleville washers, or alternatively the pitch resilience device may be any form of resilient member such as a rubber or polyurethane moulding.

Alternatively, each pitch resilience device comprises a pair of primary chambers, a moveable member being provided in each primary chamber to form four pitch resilience device chambers in each pitch resilience device; wherein two of the pitch resilience device chambers in each pitch resilience device which vary in volume inversely proportionally to each other provide first and second compression pitch chambers; and the other two pitch resilience device chambers in each pitch resilience device provide first and second pitch control chambers.

The first pitch control chamber of the first pitch resilience device may be fluidly connected to the first pitch control chamber of the second pitch resilience device and the second pitch control chamber of the first pitch resilience device may be fluidly connected to the second pitch control chamber of the second pitch resilience device.

The first and second pitch control chambers may be gas filled to thereby provide a controlled amount of pitch resilience.

Alternatively, the first and second pitch control chambers may be liquid filled and in fluid communication with respective first and second fluid pressure accumulators. In this case, pitch damping means may be included between the pitch control chambers and the pressure accumulators for damping said fluid communication. If the pitch control chambers are in fluid communication between the first and second pitch resilience devices, then only one accumulator is required for a pair of first pitch control chambers and one for a pair of second pitch control chambers, each pair of pitch control chambers and the associated accumulator forming a pitch control volume. If the pitch control chambers are not interconnected between pitch resilience devices then an accumulator may be provided for each pitch control chamber, each pitch control chamber and associated accumulator thereby forming a pitch control volume.

For any configuration of the pitch resilience devices, there may be provided four pitch resilience devices, the first and second pitch resilience devices being positioned towards a first end of the vehicle and a third and a fourth pitch resilience device being positioned towards a second end of the vehicle, the third pitch resilience device being connected in parallel to the first pitch resilience device and the fourth pitch resilience device being connected in parallel with the second pitch resilience device.

Additional valves may be provided to block one or more paths of fluid communication in the hydraulic system for failsafe and/or dynamic control.

Where the vehicle support means are the primary means of vehicle support, all of the volumes in the hydraulic system can be run at the same pressure. Also, as the system usually contains hydraulic fluid and gas, both of which expand with increasing temperature, a pressure compensation arrangement may be provided in order to maintain the system static pressure and roll stiffness within a design range over the design temperature. This pressure compensation arrangement may also be used to compensate for any fluid loss over time. Therefore, there is provided a pressure maintenance device connected to each of the system volumes through respective restrictions or valves. For example, the pressure maintenance device may be connected to the left and right, first and second compression volumes, and (if present) to the pitch control volumes.

The accompanying drawings illustrate possible arrangements of the present invention. Other arrangements are possible, and consequently the particularity of the accompanying drawings is not to be understood as superseding the generality of the preceding description of the invention.

DESCRIPTION OF PREFERRED EMBODIMENTS

Figure 1:
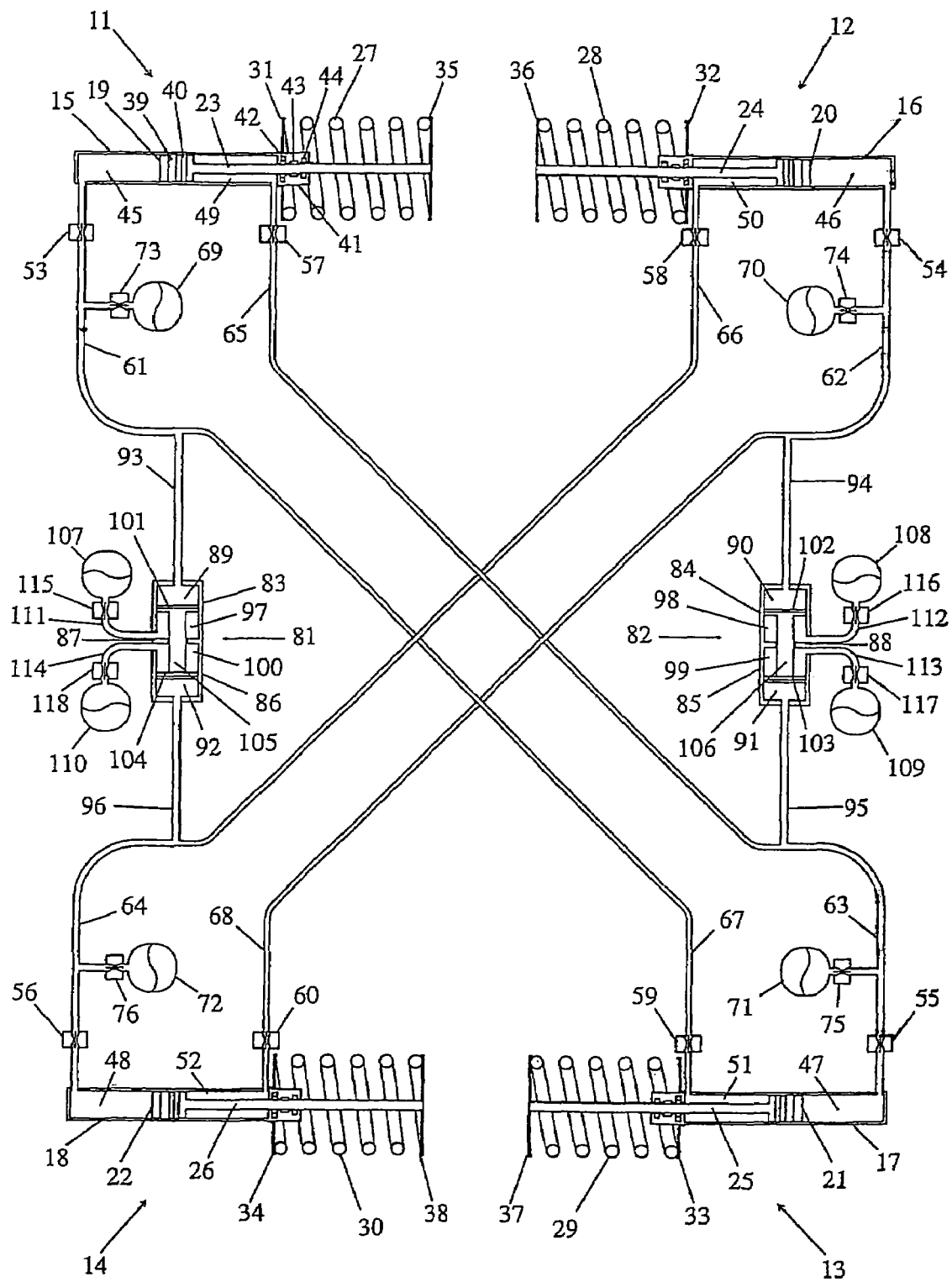
FIG. 1 shows a schematic view of a first possible arrangement of a hydraulic system having roll stiffness, roll damping, pitch stiffness and pitch damping, according to an embodiment of the present invention.

Referring initially to FIG. 1, there is shown a suspension system for a vehicle. Four wheel rams (11, 12, 13, 14) are located between the vehicle body (not shown) and four orthogonally disposed wheels (not shown) of the vehicle. Each wheel ram includes a cylinder (15, 16, 17, 18) connected to a wheel hub or other suspension geometry to move with the wheel, a piston (19, 20, 21, 22) slidably housed within the cylinder, and a rod (23, 24, 25, 26) fixed between the piston and the body of the vehicle. The connection of the rod to the vehicle body may be by any known means, usually through a rubber bushing which in the case of MacPherson strut geometry usually includes a bearing.

For ease of understanding, the vehicle resilient support means are shown as "coil-overs", i.e., coil springs (27, 28, 29, 30) positioned around the wheel ram and located between a lower spring plate (31, 32, 33, 34) fixed to the cylinder and an upper spring plate (35, 36, 37, 38) which may be connected to the rod or the vehicle body (directly or indirectly such as via a bearing or bushing). It should be understood that the resilient support means may be of any alternative known type such as variable stiffness coil springs, hydraulic chambers connected to hydro-pneumatic accumulators, air springs or any combination of these types. The resilient support means may be located around the cylinder as shown with the coil springs, integrated into the cylinder (in the case of the hydraulic chamber) or separate to the ram, which broadens the possible range of alternative resilient support means to, for example, torsion bars connected to the geometry providing wheel location. The resilient support means at the front of the vehicle may be partially or fully interconnected to provide support with reduced or zero roll stiffness and/or the resilient support means at the rear of the vehicle may be partially or fully interconnected to provide support with reduced or zero roll stiffness as is known and described in patents such as the applicant's U.S. Pat. No. 6,217,047, details of which are incorporated herein by reference. Also the wheel ram may be inverted with the cylinder inside an outer tube, the rod being fixed to the outer tube which in turn supports the lower spring plate—the upper spring plate then being mounted either to the cylinder or directly to the body.

It should be understood that the hydraulic system may also either partially support the vehicle body in combination with the vehicle resilient support means, or provide sufficient support of the vehicle body without the need for the vehicle resilient support means described above. As this generally requires higher pressures in the hydraulic system and larger diameter rods in the wheel rams, friction is increased, so this is not preferred for refined on-road vehicle applications.

The wheel rams shown in the figures are basically conventional double-acting rams for simplicity. Taking the front left wheel ram 11 as an example, the piston 19 (which may be formed as an integral part of the rod 23) has two grooves containing a bearing 39 and a seal 40. In some cases, the individual bearing and seal parts can be replaced by a single item (not shown) which may be bonded to or formed around the piston for ease of assembly and low cost. The piston must always include a seal to prevent fluid flow across the piston between the compression chamber 45 and the rebound chamber 49. The cylinder end (41) has three grooves containing a rod seal 42, a bearing 43 and a rod wiper 44 or other form of secondary seal such as an excluder. Again some of these components can be combined, but a seal must be provided between the rebound chamber and atmosphere. Each ram therefore has a compression chamber (45, 46, 47, 48) and a rebound chamber (49, 50, 51, 52) formed by the piston (19, 20, 21, 22) within each cylinder (15, 16, 17, 18).

The direct damping of each wheel ram can be accomplished by the provision of compression (53-56) and rebound (57-60) damper valves mounted on conduits (61-66) close to the compression and rebound chambers of each wheel ram. These damper valves can be single-acting, working on restricting fluid flow out of either a compression or a rebound chamber, or they may be double acting, in which case only one valve (on either the compression or preferably on the rebound chamber) may be utilised. These damper valves can be located in the wheel ram body where there is package space, or attached to the wheel ram body or in the conduits as shown.

The four double-acting wheel rams are connected by a pair of diagonal circuits to provide passive de-coupling of roll and pitch stiffness from heave stiffness. The first diagonal circuit comprises two fluid volumes being a front left compression volume and a back right compression volume. The front left compression volume includes the front left compression chamber 45, a front left compression conduit 61, a back right rebound conduit 67 and a back right rebound chamber 51. The back right compression volume similarly includes a back right compression chamber 47, a back right compression conduit 63, a front left rebound conduit 65 and a front left rebound chamber 49.

The second diagonal circuit similarly comprises two fluid volumes being a front right compression volume and a back left compression volume. The front right compression volume includes the front right compression chamber 46, a front right compression conduit 62, a back left rebound conduit 68 and a back left rebound chamber 52. The back left compression volume similarly includes a back left compression chamber 48, a back left compression conduit 64, a front right rebound conduit 66 and a front right rebound chamber 50.

For this base diagonal connection arrangement to function, resilience is required. This can be provided by using a compressible fluid, any type of accumulator device such as a bladder or diaphragm type or a piston type with a gas or mechanical spring or by using some other form of resilience such as hoses with a suitable pressure expansion characteristic. In FIG. 1, a diaphragm type hydro-pneumatic accumulator (69, 70, 71, 72) is shown on each of the four compression volumes, connected to the respective compression volume through a damper valve (73, 74, 75, 76).

This base diagonal connection arrangement would displace fluid as follows: in roll and pitch, fluid volumes corresponding to a compression chamber and the annular rebound chamber of the diagonally opposite wheel ram are displaced (into or out of any resilient device such as an accumulator); whereas in heave, only a fluid volume corresponding to a rod volume (compression chamber minus annular rebound chamber) would be displaced (into or out of the resilient device). The high relative volume displaced into the compression volume accumulators (69 to 72) in the roll and pitch modes relative to the heave mode gives a higher roll and pitch stiffness than heave stiffness. There is also a higher fluid flow rate through the compression volume accumulator damper valves (73 to 76) in the roll and pitch modes relative to the heave mode thereby conferring a higher damping rate in the roll and pitch modes relative to heave.

However the first and second diagonal circuits are connected by at least a first and a second pitch resilience device (81, 82) to provide additional resilience in the hydraulic system in the pitch mode. The first pitch resilience device (81) is connected between the front left compression volume and the back left compression volume. Similarly, the second pitch resilience device (82) is connected between the front right compression volume and the back right compression volume. The pitch stiffness of the hydraulic system can be designed to be anywhere in the region from zero pitch stiffness (with infinite resilience in the pitch resilience devices) to the maximum pitch stiffness possible (with zero resilience in the pitch resilience devices). This maximum pitch stiffness is the same as the pitch stiffness of the basic arrangement of the two diagonal circuits (without any pitch resilience devices) and is determined by the roll stiffness of the hydraulic system and the geometry of the suspension locating components of the vehicle.

Damping the pitch resilience provides modal pitch damping, i.e., the pitch mode of the hydraulic system is damped, while providing little or no damping effect on pure roll and heave motions. In addition, the wheel damper valves can be used to provide a damping force in pitch motions, but as the wheel dampers are not modal dampers, that damping force acts directly, in all modes, and will be present in roll, warp and heave also. The damping means which are used to damp the resilience in the pitch resilience devices are referred to herein as pitch dampers.

In FIG. 1, the pitch resilience devices are shown as hydraulic cylinder arrangements with hydro-pneumatic springs. Looking initially at the first pitch resilience device 81, there is provided two axially aligned cylinder bores (83 and 86), separated by a central wall (87). Each cylinder bore is divided into two chambers (89 and 97; 92 and 100) by a piston (101, 104), the two pistons being connected by a rod (105), the two pistons and the rod together forming a piston rod assembly. As shown, the frontmost chamber 83 is a front left compression pitch chamber and is connected to the front left compression volume of the hydraulic system by the front left compression pitch conduit 93. Similarly, the rearmost chamber 92 is a rear left compression pitch chamber and is connected to the rear left compression volume by the rear left compression pitch conduit 96.

The frontmost central chamber 97 is a front left pitch control chamber and is connected to a front left pitch resilience accumulator 107 via a front left pitch resilience control conduit 111 and a pitch damper valve 115. Similarly, the rearmost central chamber 100 is a back left pitch control chamber and is connected to a back left pitch resilience accumulator 110 via a back left pitch resilience control conduit 114 and a pitch damper valve 118.

The Operation of the Hydraulic System is Basically as Follows:

In heave, fluid volumes corresponding to the left and right rod volumes of the wheel rams are displaced into or out of the compression volume accumulators (69, 70, 71 and 72). The rod volumes are generally small in relation to the accumulator gas volumes, so the pressure change in heave is also small, which acting over effectively only the rod areas, provides little change in wheel force. Therefore the hydraulic system has very low heave stiffness. The low fluid flows into the compression volume accumulators (69 to 72) also give a low flow rate through the compression volume damper valves (73 to 76), giving little heave damping effect from these damper valves. If the volume of fluid displaced from the individual wheel rams is not matched front to rear and/or if the piston areas in the pitch resilience devices do not match the pressure change in the front and rear compression volumes, then some motion of the pitch resilience device piston rod assemblies will occur in pure heave motions.

In roll, for example when making a right turn causing the vehicle to roll to the left, the front left and back left compression volumes increase in pressure (due to fluid from the front left compression chamber 45 and the back right rebound chamber 51 entering the front left compression volume accumulator 69, and due to fluid from the back left compression chamber 48 and the front right rebound chamber 50 entering the back left compression volume accumulator 72) and the right compression volume reduces in pressure (due to fluid entering the front right compression chamber 46 and the back left rebound chamber 52 from the front right compression volume accumulator 70, and due to fluid entering the back right compression chamber 47 and the front left rebound chamber 49 from the accumulator 71) thereby providing the necessary roll couple. The pitch resilience devices 81 and 82 react the roll loads on the hydraulic system by ensuring that the pressures generated in the compression volumes and therefore the pitch chambers for one side of the vehicle are reacted across a solid piston or piston rod assembly. Therefore, in a hydraulic system with equal sized wheel rams front and rear, equal front and rear mechanical advantage in on the wheel rams, equal stiffness of the front and rear compression volumes and their accumulators and equal sized pitch resilience device cylinder bores (83, 84, 85, 86) there is no motion of the pitch resilience device piston and rod assemblies in pure roll. To set the roll moment distribution of the hydraulic system to something other than fifty percent, the size of the wheel rams can be different from front to rear, or the front and rear portions of each pitch resilience device can be of differing bore diameter (this latter option being less effective), in which case there can be some small motion of the piston rod assembly in each pitch resilience device during pure roll motions.

As the roll moment distribution of the hydraulic system may not match the roll moment distribution of the suspension system as a whole (due to the coil spring rates, front to back bushing stiffness differences, etc) it may be necessary to provide different levels of roll damping on the front wheels compared to the back wheels. The easiest way to gain additional roll damping at one end of the vehicle is to use the rebound and compression wheel damper valves (53 to 60), although this can, depending on the magnitude, reduce the modal damping benefits of the hydraulic system. An alternative method is to change the balance between the front compression volume accumulator damper valves, the rear compression volume accumulator damper valves and the pitch damper valves. Changing this balance can also influence the motion of the piston rod assemblies in the pitch resilience device as the vehicle undergoes a roll motion.

In pitch, for example when braking, fluid is displaced out of the front ram compression chambers 45, 46 and the back ram rebound chambers 51, 52, through the front compression conduits 61, 62 and into the front compression volume accumulators 69, 70 and the front compression pitch chambers 89, 90 (through the front compression pitch conduits 93, 94). The balance of fluid flow is determined by the balance between the stiffness (and damping) of the basic X-layout arrangement of compression conduits and accumulators as described above, and the stiffness (and damping) of the pitch resilience means. The stiffness of the pitch resilience means is tuneable through the layout and the rod, bore and accumulator sizing, along with the accumulator pre-charge and the static hydraulic operating pressure of the system. The damping of the pitch resilience device can be through the pitch damper valves (115 and 116; and/or 117 and 118) which are part of the pitch resilience device as shown in FIG. 1 and/or through separate pitch damper valves in the pitch conduits (93 and 94; and/or 95 and 96).

As the pressure in the front compression pitch chambers increases and the piston rod assemblies in the pitch resilience devices are displaced, fluid is displaced out of the front pitch control chambers 97, 98 through the front pitch damper valves 115, 116 into the front pitch accumulators 107, 108, increasing the pressure in the front pitch control chambers and providing a damped pitch resilience. The motion of the piston rod assemblies in the pitch resilience devices also displaces fluid out of the back compression pitch chambers 91, 92 through the back compression pitch conduits 95, 96 into the back compression conduits providing fluid flow into the front ram rebound chambers and the back ram compression chambers, permitting the vehicle to pitch. This pitch motion is controlled by the resilience and damping of the pitch resilience devices 81, 82.

As can be readily understood, in braking (or in any similar direction pitch motion of the wheels with respect to the vehicle body), fluid is transferred between the front and rear compression volumes in this single direction through the pitch conduits (93 to 96) and the first and second pitch resilience devices 81, 82. During pitch motions of the opposite sense, for example when accelerating, fluid flows in the opposite direction through the pitch conduits (93 to 96) and the first and second pitch resilience devices 81, 82. Therefore it is preferable to use different resilience and damping characteristics for flow in the two different pitch directions, to thereby give independent control of the braking direction pitch damping and the acceleration direction pitch damping. This is clearly desirable as the pitch velocities, accelerations, peak forces and general requirements (such as trade off between forces for control and comfort) can be very different in the two directions.

If the roll moment distribution of the hydraulic system is not 50%, or due to geometry or other effects, the effective pitch stiffness and the pitch damping force produced by the hydraulic system may not be matched from one end of the vehicle to the other. The wheel damper valves can be used to compensate for any difference in front to rear pitch damper effect, especially as this difference is usually in the same direction as any imbalance in roll damping, which can also be additionally provided by the wheel damper valves, the hydraulic system still providing a better compromise than a conventional suspension system.

In warp, fluid volumes corresponding to the rod volumes from one diagonal circuit are passed into the other diagonal circuit through the first and second pitch resilience devices (81, 82). Therefore the hydraulic system has a very low warp stiffness which is, in part, determined by the heave stiffness, then further reduced by the pitch resilience. Warp damping can primarily be provided by the wheel damper valves.

As will be apparent to one skilled in the art, there are many variations possible to the pitch resilience arrangement in FIG. 1, such as using alternative forms of resilience in place of the accumulators, using different styles and placements of pitch dampers and changing the connection sequence of the chambers in the pitch resilience device. For example, the rearmost chamber 92 could be connected to the front left compression volume by the front left compression pitch conduit 93, the rearmost central chamber 100 could be connected to the back left compression volume by the back left compression pitch conduit 96, the frontmost chamber 89 would then be the front left pitch control chamber and the frontmost central chamber 97 would be the back left pitch control chamber. These changes made to the first pitch resilience device 81 can be mirrored in the second pitch resilience device 82. Indeed to maintain the functionality of the pitch resilience devices of a system shown in FIG. 1, the required connectivity can be described generically as follows, using the two sides of the vehicle as first and second sides: Any chamber of say the first pitch resilience device 81 can be set as a first front system chamber, connected to the first front compression volume, then the chamber which varies in volume in the same direction as the first front system chamber is the first back pitch control chamber. Then one of the remaining chambers (which must both by definition vary in volume in the opposite direction (ie inversely proportionally) to the first front system chamber with motion of the piston and rod assemblies) is a first back system chamber and the other remaining chamber is a first front pitch control chamber.

In FIG. 1 the pitch damper valves are shown between the cylinders of the pitch resilience devices and the actual resilience, i.e., the accumulators. In this case, the damper valves can be single-acting and only provide a significant damping pressure drop for fluid flow into the respective accumulators, with a negligible pressure drop for fluid flow out of the accumulators. Alternatively, a single-acting pitch damper valve can be used in each pitch conduit (93-96), or one double-acting pitch damper valve can be used in one of the left pitch conduits (93, 96) and one double-acting pitch damper valve can be used in one of the right pitch conduits (94, 95). This pitch damper valve may be a passive orifice, a passive multi-stage damper valve or any form of variable damper valve and may even provide for complete blocking of the pitch conduits. The pitch damper may be a single, double-acting valve or two single-acting valves and may include a lock-off or blocking valve or any other known form of controllable restriction. Alternatively, the pitch damper may be of any known form, such as a simple switched damper incorporating a switchable bypass around each pitch damper valve or a simple controlled bleed orifice. If the valves include a lockout or blocking feature, they can be used as part of a failsafe function as discussed later in this document.

Figure 2:
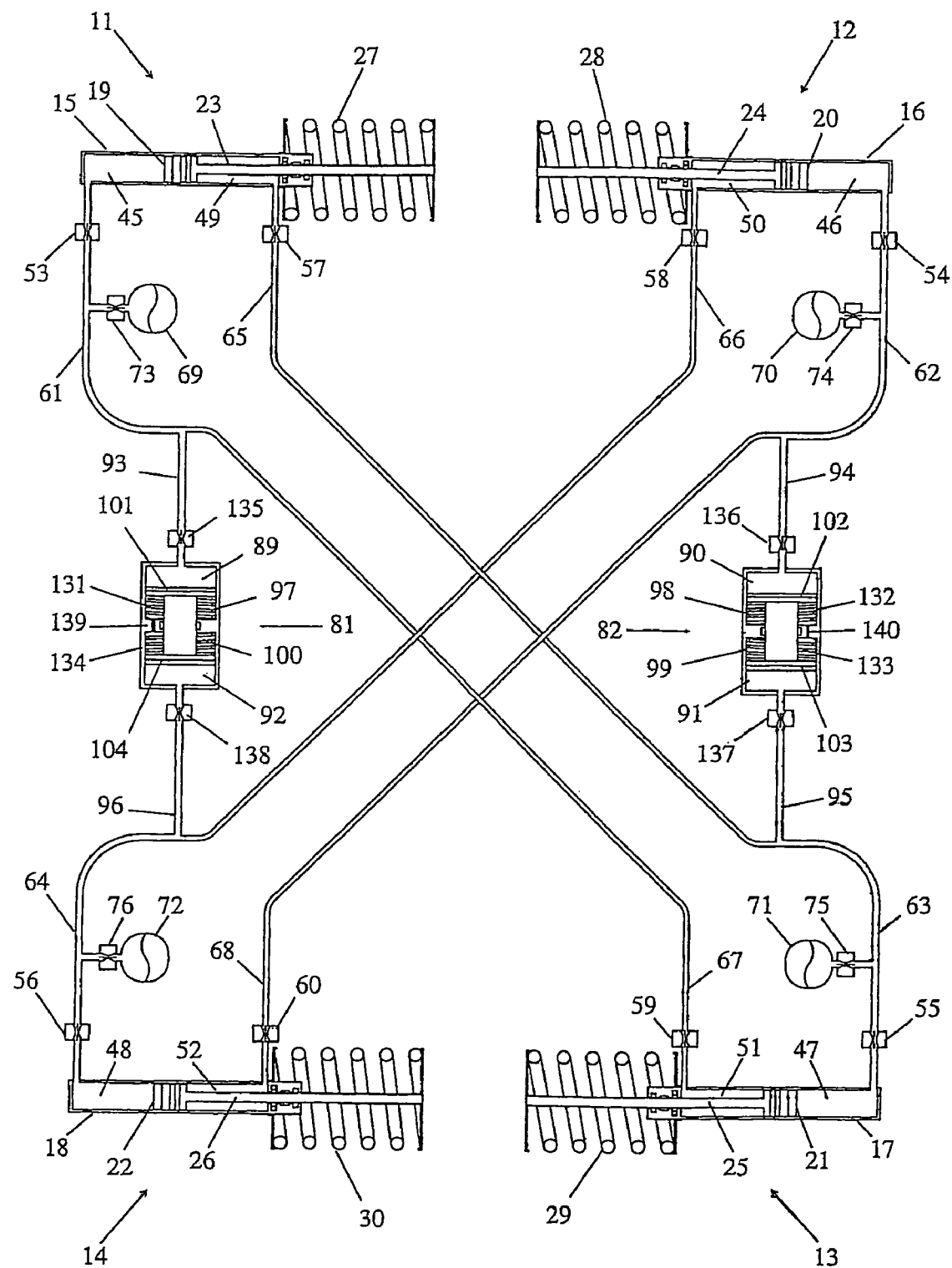
FIG. 2 shows a schematic view of an alternative embodiment of the first possible arrangement of the hydraulic system of FIG. 1.

An alternative arrangement of the pitch resilience device 81, 82 is shown in FIG. 2. Like items are assigned like reference numerals. The basic cylinder and piston rod assembly is similar to that in FIG. 1. However in FIG. 2, one of the possible alternative forms of resilience is shown in place of the hydro-pneumatic accumulators. Coil springs (131 to 134)

are located in the central pitch control chambers. The free length of the coil springs can be chosen to give the desired resilience vs deflection of the pitch resilience device piston rod assemblies. For example, if the free length of the springs is less than the stroke of the piston, then the pitch stiffness under small displacements will be greater than the pitch stiffness during larger displacements, which can be advantageous in that it can control the body attitude with longitudinal acceleration over flat surfaces and also limit peak force while absorbing speed bump type inputs. Similarly, the coil springs can each be of varying stiffness using spring design techniques such as varying coil diameter, wire diameter and/or coil pitch. Any form of alternative mechanical spring such as Belleville washers or resilient members (for example elastomers such as urethane or rubber) can be substituted for the coil springs. Alternatively the central pitch control conduits can be gas filled and act as gas springs.

Damping of the pitch resilience device can be through damper valves 135 to 138 in the pitch conduits 93 to 96 (as discussed as an option for FIG. 1). The central pitch control chambers can be filled with fluid at the same pressure as the other hydraulic volumes of the system to aid free motion of the pitch resilience device pistons (101 to 104). If the pitch control chambers are fluid filled, then a vent passage 139, 140 needs to be made between the front and rear front and rear pitch control chambers, to prevent hydraulic lock and to permit the piston rod assemblies to move. These vent passages can be free flowing, or alternatively they may be used to control fluid flow between the front and rear pitch control chambers and thereby provide pitch damping in addition to or instead of the pitch damper valves 135 to 138 in the pitch conduits. The vent passages can therefore include any form of damper valve (such as passive single or multi-stage or active damper valves).

Figure 3:
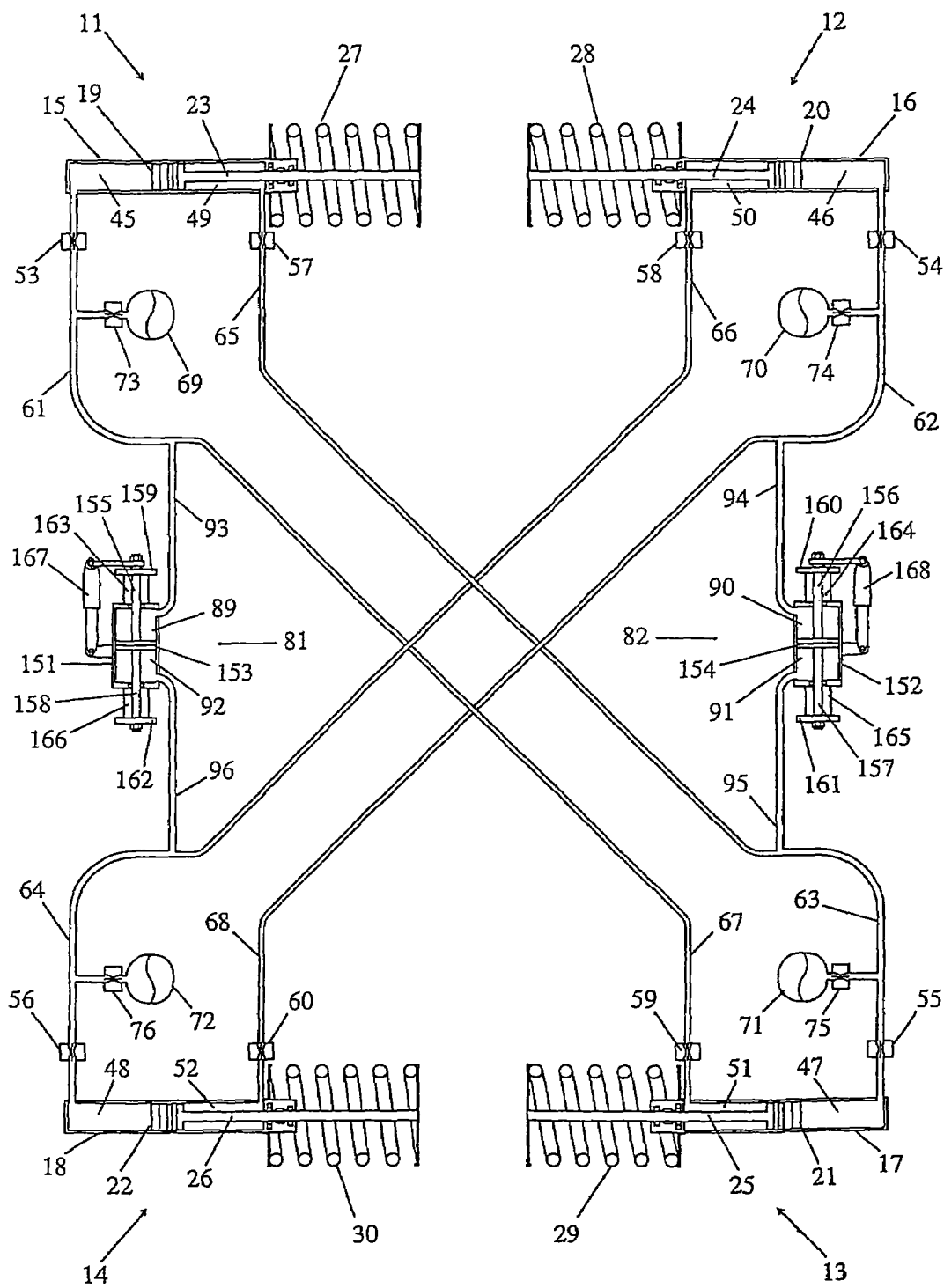
FIG. 3 shows a schematic view of a further embodiment of the first possible arrangement of the hydraulic system.

FIG. 3 shows a further alternative arrangement of the pitch resilience device 81, 82 in a hydraulic system similar to that in FIG. 1. Again both pitch resilience devices are constructed the same, so the pitch resilience device 81 on the left hand side will be explained in detail. In this case the pitch resilience device 81 comprises a single cylinder 151, having a bore and end caps. The cylinder is divided by a piston 153, into two chambers (a front left compression pitch chamber 89 and a back left compression pitch chamber 92). The pitch chambers 89, 92 are connected to the corresponding front left pitch volume and back left pitch volume through respective front and back left compression pitch conduits 93, 96 into the front left compression conduit (61) and the back left compression conduit (64). A rod 155, 158 extends from each side of the piston 153 through the pitch chambers 89, 92 and has a washer or plate 159, 162 at each end. Between each plate 159, 162 and the end caps of the cylinder 151 is a resilient means such as an elastomeric member 163, 166. There is also a damper unit 167 attached between the end of at least one of the rods and the cylinder. Thus as the pitch resilience device transfers fluid between the front and back compression volumes, the piston and rods slide back and forth, compressing the resilient means and therefore providing a controlled amount of pitch resilience, the damper unit 167 providing damping of this pitch resilience.

Figure 4:
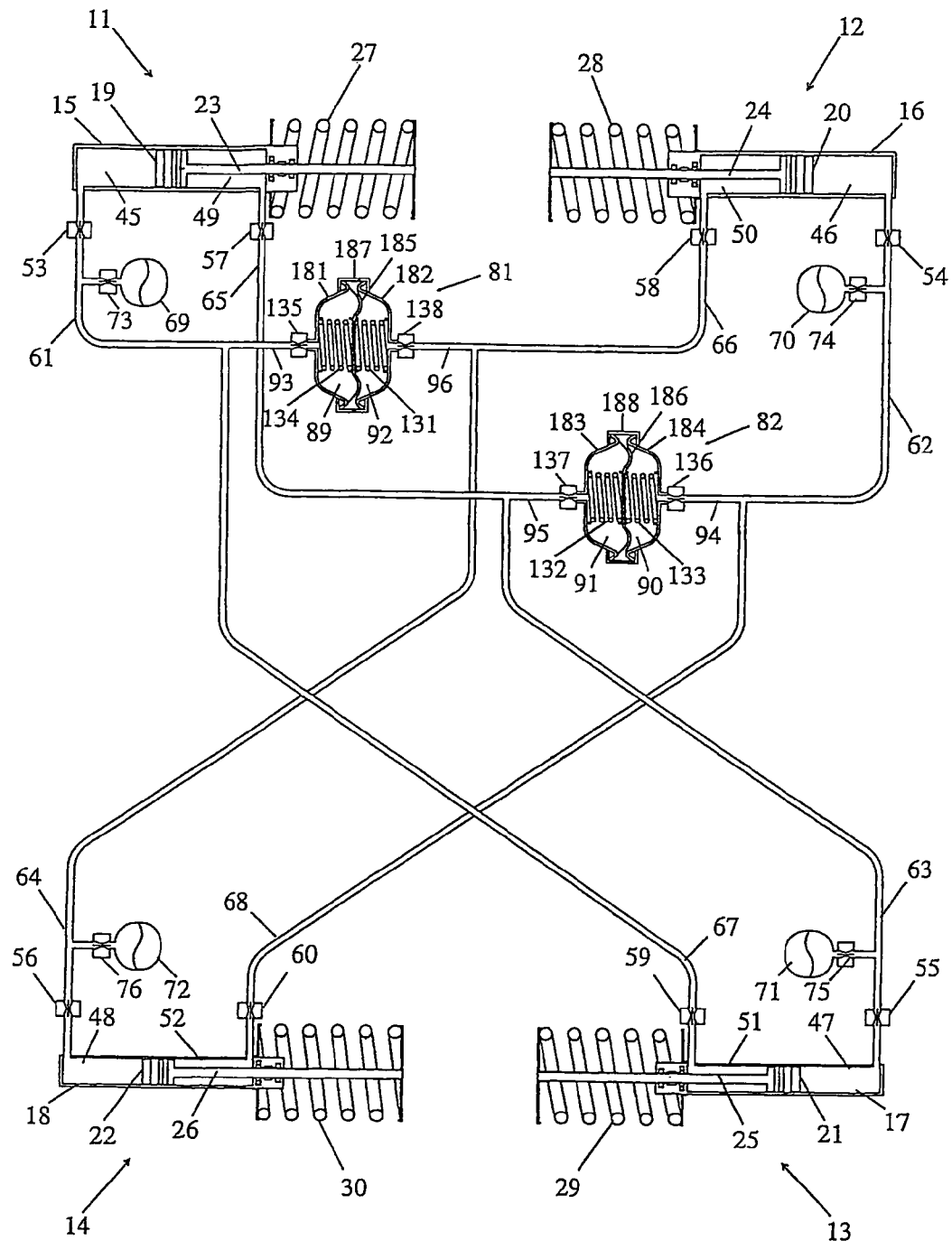
FIG. 4 shows a schematic view of a second possible arrangement of a hydraulic system according to an embodiment of the present invention, being similar to the first arrangement, having the same connection sequence, but with different routing of the conduits.

An alternative arrangement of the hydraulic system is shown in FIG. 4. Although the layout of the hydraulic lines appears different to that of FIGS. 1, 2 and 3, the connectivity is the same. The routing of the compression and rebound conduits around the vehicle clearly affects the length of those conduits and in turn the fluid friction resisting flow through the conduits, the compressible volume of fluid in the system and the mass of fluid accelerated around the vehicle. To achieve the best ride comfort with small diameter conduits that can be easily packaged, the routing of the compression and rebound conduits is therefore important. The layout of lines in FIG. 4 suits a vehicle with a forward roll moment distribution. In this case, the two front wheel rams would have a larger fluid volume and flow and so the pitch resilience devices are located closer to the high flow front wheel rams than the lower flow rear wheel rams.

A further alternative arrangement of the pitch resilience device is also shown in FIG. 4. Again taking the example of the left pitch resilience device 81, it can be seen that the basic arrangement of the device is similar to that in FIGS. 2 and 3, utilising mechanical springs as the resilient means but with a diaphragm separating the front and rear left compression pitch chambers. The body of the pitch resilience device 81 has two halves 181, 182 having the diaphragm 185 sandwiched therebetween and the halves are held together by a ring 187. In this case, the front left pitch resilience spring 131 is a coil spring located in the back left compression pitch chamber 92.

Figure 5:
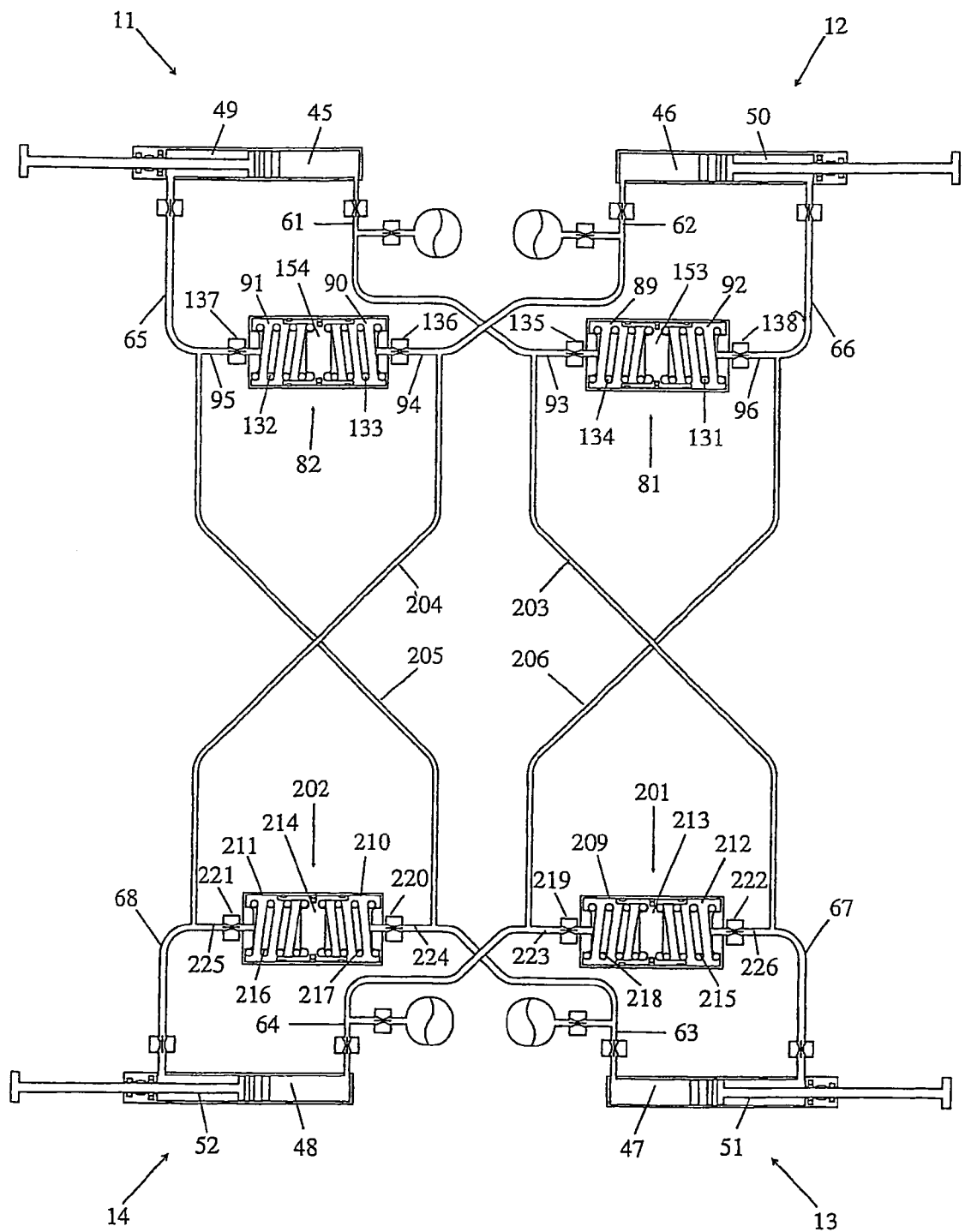
FIG. 5 shows a schematic view of a further embodiment of the second possible arrangement of the hydraulic system.

A further alternative arrangement of the hydraulic system is shown in FIG. 5. This again has the same general connectivity of the other figures, with the addition of a supplementary pair of pitch resilience devices in parallel with the first and second pitch resilience devices 81, 82. The support coil springs shown around the wheel rams in FIGS. 1 to 4 have been omitted and the wheel rams themselves (11 to 14) are shown inverted. As will be apparent to one skilled in the art, the wheel rams may be used in a wide variety of vehicle suspension arrangements and may be mounted separate to the support springs of the vehicle. For example, with the wheel rams inverted as shown, although the fluid from the rebound chambers is shown as exiting the wheel ram adjacent the rebound chamber for clarity, the fluid from the rebound chamber may flow up a pipe alongside the cylinder bore, or flow through an annular passage around the cylinder bore. The latter arrangement is frequently used in 'coil-over' arrangements as the outer surface of the wheel ram is actually the outer surface of a sleeve carrying rebound fluid around the cylinder bore. The outer surface of the rebound fluid sleeve can be used as a bearing surface, with a lower tube attached to the wheel geometry (or directly to the hub in the case of a McPherson strut arrangement) being used to transfer the bending loads in the wheel ram between the lower tube and the outer surface of the rebound fluid sleeve. This arrangement is known in conventional "shock-absorber" designs for vehicles such as rally cars with McPherson strut geometry as higher bending loads can be withstood. The design has the additional advantages that the wheel ram rod can be of smaller diameter, giving a greater rebound annular pressure area for a given piston compression area, and the that the compression and rebound fluid ports for the wheel ram can be at the top of the wheel ram, where movement is at a minimum and where they can easily be passed through the inner wing and protected from road grime and stones for example.

The layout of the front end of the vehicle in FIG. 5 is similar to that shown in FIG. 4. The arrangement at the front is duplicated at the rear with longitudinal conduits 203 to 206 connecting the additional pitch resilience devices 201, 202 at the rear of the vehicle in parallel with the first and second pitch resilience devices 81, 82 at the front of the vehicle. All four pitch resilience devices are of the same type, the construction of the first pitch resilience device being described below by way of example.

The pitch resilience device 81 is similar to that in FIG. 3, having a single cylinder 151 separated into a front left compression pitch chamber 89 and a back right compression pitch chamber 92 by a piston 153. As the back right compression pitch chamber 92 is connected to both the compression chamber of the back right wheel ram and the rebound chamber of the front left wheel ram and as there is now a duplicate pitch resilience device at the back of the vehicle also communicating with these two wheel ram chambers, it will be convenient for understanding to refer to the back right compression pitch chamber 92 of the first pitch resilience device 81 as the front left rebound pitch chamber 92. As in FIG. 4, the resilience in the pitch resilience device is provided by coil springs (although a stack of Belleville washers or any other suitable form of resilient member could be used). The cylinder 151 and piston 153 are shaped to receive the coil springs. Indeed, as there is no rod to align the piston in the cylinder bore, the piston is of a longer design to also provide stable alignment of the piston within the cylinder, the piston including a bearing at either end, and a central seal.

The layout of the hydraulic system can be explained as follows. At the front of the vehicle, the compression chamber 45 of the front left wheel ram is connected (through a wheel damper valve) to the front left compression conduit 61. The rebound chamber 50 of the front right wheel ram is connected (through a wheel damper valve) to the front right rebound conduit 66. The front left compression chamber 89 of the first (or front left compression) pitch resilience device 81 is connected to the front left compression conduit 61 through the front left compression pitch conduit 93 and the optional pitch damper valve 135. The back left compression (or front right rebound) chamber 92 of the front left compression pitch resilience device 81 is connected to the front right rebound conduit 66 through the front right rebound pitch conduit 96 and the optional pitch damper valve 138. For pitch damping to be present, the flow in both directions through the front left compression pitch resilience device must be damped using one or a combination of both pitch damper valves 135 and 138.

Similarly, the second (or front right compression) pitch resilience device 82 has its front right compression pitch chamber 90 connected to the front right compression conduit 62 through the front right compression pitch conduit 94 and the optional pitch damper valve 136. The back right compression (or front left rebound) chamber 91 of the front right compression pitch resilience device 82 is connected to the front left rebound conduit 65 through the front left rebound pitch conduit 95 and the optional pitch damper valve 137. Again, for pitch damping to be present, the flow in both directions through the front right compression pitch resilience device must be damped using one or a combination of both pitch damper valves 136 and 137.

As discussed above, the arrangement of front conduits and front compression pitch resilience devices is duplicated for the back wheel rams. A third (or back left compression) pitch resilience device 201 has a back left compression pitch chamber 209 connected to the back left compression conduit 64 (via a back left compression pitch conduit 223 and an optional pitch damper valve 219) and a back right rebound pitch chamber 212 connected to the back right rebound conduit 67 (via a back right rebound pitch conduit 226 and an optional pitch damper valve 222). Similarly, a fourth (or back right compression) pitch resilience device 202 has a back right compression pitch chamber 210 connected to the back right compression conduit 63 (via a back right compression pitch conduit 224 and an optional pitch damper 220) and a back left rebound pitch chamber 211 connected to the back left rebound conduit 68 (via a back left rebound pitch conduit 225 and an optional pitch damper 221). Again, for pitch damping to be present, the flow in both directions through the back left compression pitch resilience device 201 must be damped using one or a combination of both pitch damper valves 219 and 222, and the flow in both directions through the back right compression pitch resilience device 202 must be damped using one or a combination of both 220 and 221.

The longitudinal conduits connect the front and rear arrangements together, maintaining the same connectivity between diagonally opposed rams as in FIGS. 1 to 4. The front left compression longitudinal conduit 203 connects the front left compression conduit 61 directly with the back right rebound conduit 67, the front right compression longitudinal conduit 204 connects the front right compression conduit 62 directly with the back left rebound conduit 68, the back right compression longitudinal conduit 205 connects the back right compression conduit 63 directly with the front left rebound conduit 65, and the back left compression longitudinal conduit 206 connects the back left compression conduit 64 directly with the front right rebound conduit 66.

The front left compression volume now comprises the compression chamber 45 of the front left wheel ram 11, the front left compression conduit 61, the front left compression pitch conduit 93, the front left compression pitch chamber 89, the front left compression longitudinal conduit 203, the back right rebound pitch conduit 226, the back right rebound pitch chamber 212, the back right rebound conduit 67 and the rebound chamber 51 of the back right wheel ram 13. Similarly, the front right compression volume now comprises the compression chamber 46 of the front right wheel ram 12, the front right compression conduit 62, the front right compression pitch conduit 94, the front right compression pitch chamber 90, the front right compression longitudinal conduit 204, the back left rebound pitch conduit 225, the back left rebound pitch chamber 211, the back left rebound conduit 68 and the rebound chamber 52 of the back left wheel ram 14. The back right compression volume now comprises the compression chamber 47 of the back right wheel ram 13, the back right compression conduit 63, the back right compression pitch conduit 224, the back right compression pitch chamber 210, the back right compression longitudinal conduit 205, the front left rebound pitch conduit 95, the front left rebound pitch chamber 91, the front left rebound conduit 65 and the rebound chamber 49 of the front left wheel ram 11. The back left compression volume now comprises the compression chamber 48 of the back left wheel ram 14, the back left compression conduit 64, the back left compression pitch conduit 223, the back left compression pitch chamber 209, the back left compression longitudinal conduit 206, the front right rebound pitch conduit 96, the front right rebound pitch chamber 92, the front right rebound conduit 66 and the rebound chamber 50 of the front right wheel ram 12.

The arrangement in FIG. 5 operates in a similar manner to the arrangements in the other figures. For example, when turning to the right, the load on the left wheel rams 11 and 14 increases and the load on the right wheel rams 12 and 13 decreases. The increase in pressure in the front left compression volume is balanced across the piston 153 of the front left compression pitch resilience device 81 and the piston 213 of the back left compression pitch resilience device 201 by the increase in pressure in the back left compression volume. Similarly the decrease in pressure in the front right compression volume is balanced across the piston 154 of the front right compression pitch resilience device 82 and the piston 214 of the back right compression pitch resilience device 202 by the decrease in pressure in the back right compression volume. For vehicles with a 50% roll moment distribution and equal pitch resilience device pistons (153, 154, 213, 214) and springs (131-134 and 215-218), the deflection of the pistons

153, 154, 213 and 214 will be negligible while achieving this pressure balance in pure roll motions.

When braking, the load on the front wheel rams 11 and 12 increases and the load on the back wheel rams 13 and 14 decreases. The increase in pressure in the front left compression volume and the decrease in pressure in the back left compression volume causes the pistons 153 and 213 to displace (in opposite directions in the figure) compressing the front left compression pitch spring 131 and the back right rebound pitch spring 218. Similarly, the increase in pressure in the front right compression volume and the decrease in pressure in the back right compression volume causes the pistons 154 and 214 to displace (in opposite directions in the figure) compressing the front right compression pitch spring 132 and the back left rebound pitch spring 217. The resilience of the pitch springs controls the additional resilience in the hydraulic system in pitch motions, as in the earlier figures, with the front and back compression pitch resilience devices acting in parallel.

Figure 6:
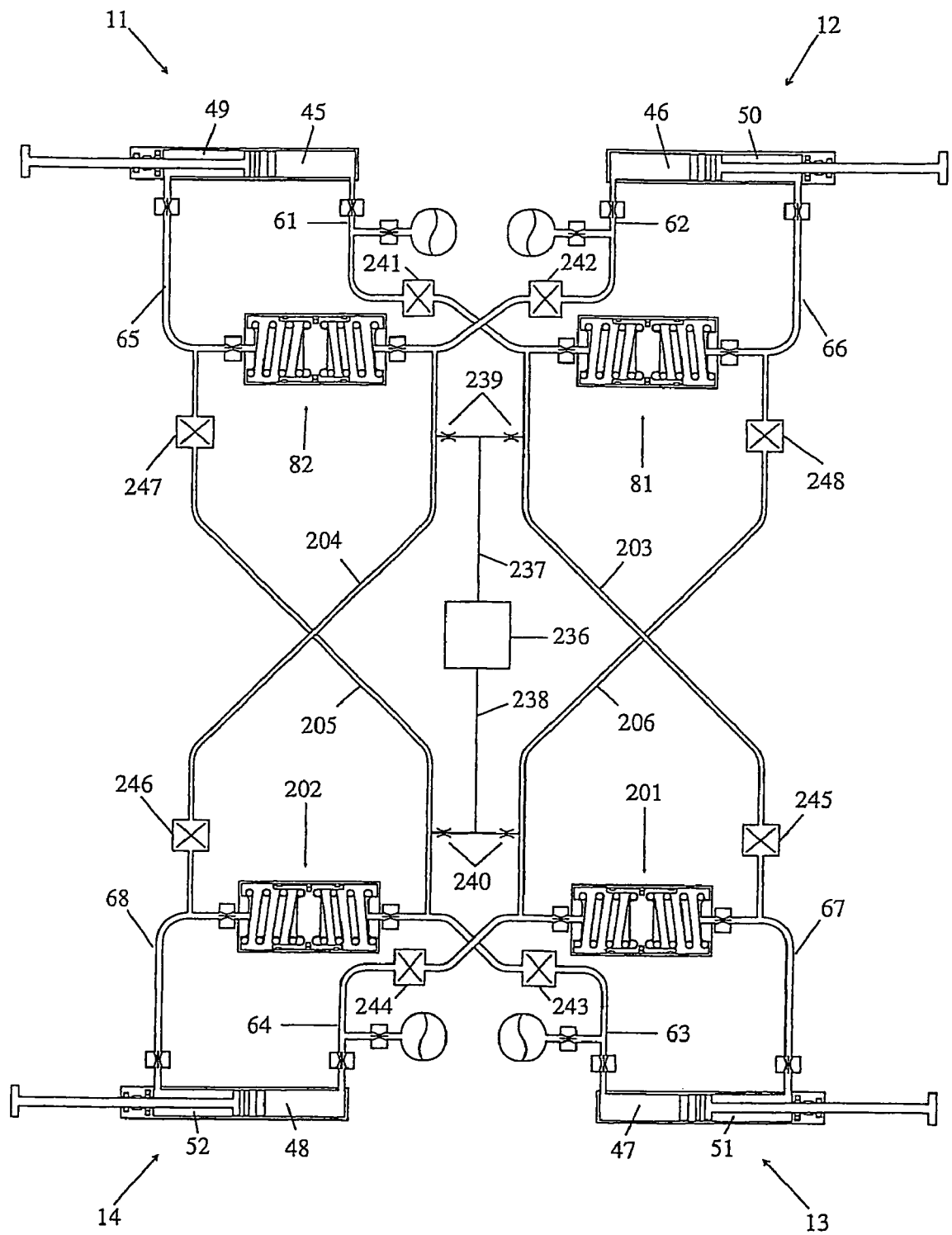
FIG. 6 shows a schematic view of an alternative embodiment of the system of FIG. 5 and additionally shows a pressure maintenance arrangement.

FIG. 6 shows additional modifications to the hydraulic system of FIG. 5, although similar modifications are possible to any of the arrangements of the hydraulic system. As the hydraulic system is not the primary means of support (i.e., the coil springs—or air, torsion, etc. springs provide a large portion of the vehicle support) the four main volumes in the system (the previously defined front left, front right, back right and back left compression volumes) can be operated at a common static pre-charge pressure. An advantage of operating all volumes at the same static pre-charge pressure is that pressure differentials across piston seals throughout the system are eliminated and so therefore are attitude changes caused by fluid leakage between the systems, and the need for a powered control system which can pump fluid between the volumes. There is therefore, a pressure maintenance device 236 provided, which is connected to the front and back left and right compression volumes. Clearly, if there are more volumes in the system, additional connections can be provided. The connection between the pressure maintenance device and the front volumes is through a conduit or passage 237 and through front pressure maintenance valves 239. Similarly, the connection between the pressure maintenance device and the back volumes is through a conduit or passage 238 and through back pressure maintenance valves 240.

The valves can be simple restrictions, solenoid valves or spool valves for example. In the figure they are illustrated as simple restrictions, each of which are typically a micro orifice with filters either side to prevent blockage, although any known restrictive means may be used. The orifice is sized to provide the characteristics required to maintain the pressures in the system volumes within an acceptable range whilst preventing significant fluid flow during cornering or braking to maintain the static roll and pitch attitude within an acceptable range when returning to straight line running.

Although the pressure maintenance device 236 may be omitted, changes in the volumes of fluid and gas in the hydraulic system and its accumulators through the operating temperature range of the vehicle are usually large enough to require some form of compensation device. The complexity of this device can vary significantly, depending on the design parameters and the functionality required.

In its simplest form, the pressure maintenance device (236) can be a simple accumulator with any known construction (for example bladder-type with gas spring, piston-type with gas spring or with mechanical spring).

Alternatively the pressure maintenance device (236) can use a fluid pressure source (such as a tank with a pump, or another vehicle system such as the power steering) to maintain the pressure in the hydraulic suspension volumes to either a fixed or a variable pressure.

The front and back system volumes can be maintained to different pressures.

If a fixed pressure is chosen, the components required can be simple, cheap, passive, mechanical parts, however as the system temperature changes, the system stiffness will change slightly. To maintain the system stiffness characteristics constant with varying temperature, the pressure in the systems must be adjusted in dependence on their temperature, which generally requires one or more temperature sensors, at least one variable pressure switch or pressure transducer and an electronic control unit.

As the roll stiffness of the hydraulic suspension system can be adjusted by changing the pressure in the systems, if a pressure maintenance device (236) with variable pressure set-points is used, the pressure can be varied in dependence on the load in the vehicle, by a driver operated mode or variable selector and/or in dependence on other parameters such as detected driving style and road surface input amplitude.

If the static pressure in the front and rear, left and right compression volumes is always set to a common pressure, only one conduit is required between the pressure maintenance device and the restrictions or valves. However, to provide a more failsafe system, at least a front and a rear conduit can be provided as shown in FIG. 6. Then the pressure maintenance device can, for example, have duplicated components so that loss of fluid from one of the front or rear compression volumes does not cause the fluid from the other volumes to be lost into the failed leaking volume. Indeed, if enough components are added, all of the hydraulic volumes of the system can have independent pressure maintenance for the best performance in the event of a failure.

Thus, if the pressure maintenance device is designed to provide two regulated pressures and is connected, for example to the left and right compression volumes by independent conduits (with or even without restrictions) then the pressure in the two left compression volumes can be controlled to be different to the pressure in the two right compression volumes to offset a static roll load on the vehicle for example due to an offset payload. Alternatively, or additionally, active roll control components can be added on to the system to provide an offset in the passive roll angle of the vehicle during turning, or completely compensate for all resilience in the hydraulic system and maintain a zero roll angle. The components (pump, tank, valves, sensors and controllers for many different algorithms) are all well known.

Similarly, if the pressure maintenance device is designed to provide two regulated pressures and is connected, for example to the front and rear compression volumes by independent conduits (as shown in FIG. 6) then the pressure in the two front compression volumes can be controlled to be different to the pressure in the two back compression volumes. Similar passive offset adjustment or active control of the pitch angle can then be added.

Four regulated pressures can be provided to enable control of roll and pitch attitude and stiffness. The control can be based on any common inputs such as pressure, displacement, acceleration and a driver operated selector.

The pressure maintenance unit is intended to be applicable to all forms of the hydraulic system according to the present invention, so applying a pressure maintenance unit to a system as shown in FIG. 1, in combination with either a common or shared front pitch chamber pressure regulation and a common or shared back pitch chamber pressure regulation, or one shared regulated pressure or four independent regulated pitch chamber pressures, is envisaged, as the ability to adjust pitch stiffness is provided by multiple or variable regulating pressure(s) using any known method such as those discussed above in relation to providing adjustable roll stiffness and/or attitude.

Also in FIG. 6, a lock out valve (241 to 244) is shown in each of the compression conduits 61 to 64. These lockout valves can be used to make the stiffness of the front and/or the back wheel rams very high to limit or prevent lift of a single wheel under extreme lateral and/or longitudinal acceleration. They can improve the stability of vehicles (especially those with a poor ratio of track to centre of mass height) in extreme manoeuvres, but also decrease the comfort of the vehicle. Therefore the minimum number of valves should be closed at the latest possible moment during such manoeuvres, preferably at or just after the predicted point of wheel lift. The point at which a vehicle wheel lifts can be predicted using a variety of control inputs such as one or more of the following: steering angle, steering rate, vehicle speed, lateral acceleration, throttle position, brake position, longitudinal acceleration, vertical acceleration, pitch rate, roll rate, wheel positions and the pressures in at least the four compression volumes of the hydraulic system. For example, when accelerating at large throttle openings from low speed with a high steering angle, it is possible on some vehicles to lift a front wheel. When this happens, or close to the predicted point that this happens, it is preferable to close the back right compression conduit lockout valve 243. One preferred alternative is to close both the back right and back left compression conduit lockout valves 243 and 244 (preferably only when back accumulators are provided to retain resilience in the blocked parts of the back right and back left compression volumes). If this is the only condition under which wheel lift can be generated, only these two back valves 243 and 244 need to be present on the vehicle. Further alternatives are to close the front right and back right compression conduit lockout valves 242 and 243 or all four compression valves or any combination. A yet further alternative is to close one or more valves (not shown) located in the rebound conduits 65 to 68, either in isolation or in combination with closing other lockout valves in the hydraulic system.

Also shown in FIG. 6 is a lockout valve 245 to 248 in each of the longitudinal conduits 203 to 206. These valves can also be used to limit wheel lift of the vehicle as described above, or to switch the roll moment distribution of the vehicle, as they isolate the front arrangement from the rear arrangement. However, these valves are in the positions preferred for isolating parts of the system in the case of failure of the hydraulic system. This failsafe function can be activated by mechanical or electrical/electronic control dependent on one or more inputs such as vehicle speed, steering angle, lateral acceleration, throttle position, brake position, longitudinal acceleration, wheel displacements, vertical acceleration, pressures in the system volumes and/or valve positions. The vehicle can be driven safely in a "limp home" mode when one of the hydraulic volumes has failed.

The failsafe operation of the valves can be integrated into, or also output to the pressure maintenance device 236. For example, if the front left compression volume loses fluid due to a failure, the lockout valve 245 in the front left compression longitudinal conduit 203 can be closed and the pressure maintenance device can be isolated from the failed volume. This can be done by detecting if the fluid loss occurred from the front left compression side or from the back right rebound side of the lockout valve 245. If the fluid loss is detected as occurring from the front left compression side of the lockout valve, then the pressure maintenance connection to that (and any other shared volume if it cannot be isolated independently) can be blocked.

A further alternative failsafe and/or wheel lift valve location is in the pitch conduits 93 to 96 and 223 to 226. Any or all of the pitch damper valves 135 to 138 and 219 to 222 may be variable valves that can be restricted down to zero flow. Alternatively, lockout valves may be positioned in at least one of the pitch conduits attached to each pitch resilience device. When these lockout valves are closed, the operation of the system reverts to that of two independent diagonal pairs of volumes so the mechanism used to generate the roll stiffness also now generates a pitch stiffness. Therefore, when these valves are closed, the pitch stiffness and damping of the hydraulic system are no longer decoupled from the roll stiffness and damping. While these lockout valves can also reduce wheel lift, they have the primary advantage of returning the system to four hydraulic volumes so if there is a failure— closing the valves should leave 3 volumes operational for a "limp home" mode. The removal of the pitch resilience of the pitch resilience device when the valves are closed can be used as a brake dive dynamic control type feature.

Other dynamic controls can also be provided utilising lockout valves or variable restriction valves. For example, there are a number of methods for adding a switchable roll stiffness feature to switch between a high and low roll stiffness setting, as opposed to the variable roll stiffness feature provided by changing the operating pressure of the hydraulic system. Where front and rear compression volume accumulators are provided, the accumulators at one end of the vehicle can be provided with valves to selectively block them off completely from the hydraulic system. For example, during straight line running of the vehicle, when a lower roll is required, the valves between the rear compression volumes and the associated accumulators can be open to give a low roll stiffness. Then when a higher roll stiffness is desired, such as during cornering, the valves can be closed to block the communication between the rear compression volumes and the associated accumulators.

Another alternative method of adding a switchable roll stiffness feature to the present invention is to provide two accumulators for at least one of the compression volumes or one of the pitch control volumes. One of the accumulators is in permanent communication with the rest of the hydraulic system, and the other accumulator is in communication with the rest of the hydraulic system by a valve which can selectively isolate this accumulator and its resilience from the hydraulic system. This can also provide an alternative switchable pitch stiffness function.

However, the preferred alternative method of providing a switched level of roll stiffness is to provide accumulators with two gas volumes. For example, a conventional accumulator can be used with an additional volume connected to the gas side of the accumulator through a valve. Then for low stiffness, the valve can be open, and for a higher stiffness, the valve can be closed.

If "bridge" valves are provided to connect together the front left and right compression volumes and/or the rear left and right compression volumes, then the roll stiffness and roll damping of the hydraulic system can be selectively removed. Similarly, if "bridge" valves are provided to connect together the front and rear left compression volumes and/or the front and rear right compression volumes, then the pitch stiffness and pitch damping of the hydraulic system can be selectively removed. These roll and/or pitch "bridge" valve arrangements may include damper valves to damp the flow of fluid through the bridge valve in a passive or controlled manner.

A further alternative is to provide a controlled switchable or preferably variable valve bypass valve into the piston between the compression and rebound chamber of the wheel rams associated with at least two orthogonally adjacent wheels. This effectively short-circuits the hydraulic system and removes all stiffness and damping if the bypass is low restriction, therefore the bypass is preferably a controlled restriction, the control being a function of many parameters, for example, wheel position, wheel velocity, body acceleration, steering angle, steering velocity, throttle and brake positions, vehicle velocity and/or any other suitable inputs. Depending on the wheel ram design, it may be simpler and/or cheaper to locate such a bypass valve between the conduits attached to the two wheel ram chambers before the damper valves to achieve the same function. While it may be desirable to remove all roll and pitch stiffness and damping, it can be preferable to locate the bypass valve after the wheel damper valves to still short-circuit the roll and pitch stiffness of the hydraulic system, but retain the wheel damping.

Lockout valves can therefore be used in a wide range of positions within the hydraulic system to provide a variety of functions such as failsafe and various dynamic control features such as wheel lift limitation, pitch stiffness switching and roll stiffness switching.

Figure 7:
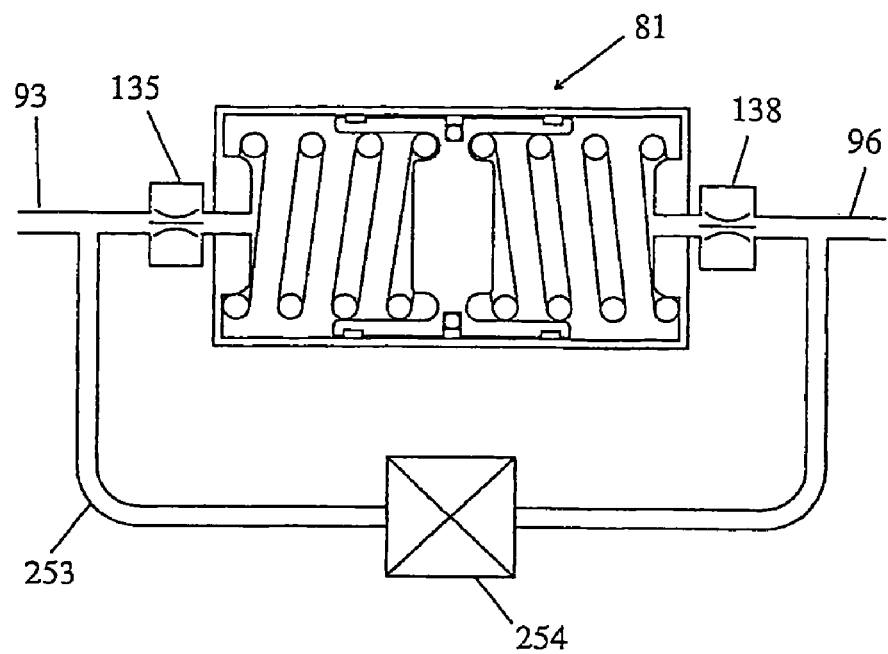
FIG. 7 shows a schematic view of part of a system according to a preferred embodiment of the present invention showing a switchable bypass conduit or passage in parallel with the pitch resilience device and the pitch dampers.

For example, FIG. 7 illustrates the first pitch resilience device 81 of FIGS. 5 and 6 with the addition of a switchable bypass conduit or passage 253 in parallel with the pitch resilience device and the pitch dampers 135 and 138 which can be applied to any of the pitch resilience devices disclosed herein to remove the pitch stiffness and damping from the associated fluid volumes. Indeed this could also be achieved by providing such a bypass at any point between the associated fluid volumes on either side of any or all of the pitch resilience devices. The switchable bypass includes a lockout valve 254.

It can be desirable to provide damping for the flow in either or both directions through the bypass conduit or passage 253 to tune the pitch damping rather than completely remove it. This damping can be provided by utilising a damping device (such as a restriction or a multi-stage damper valve in each direction) in series with the lockout valve 254 or a variable flow valve either in series with or in place of the lockout valve.

Figure 8:
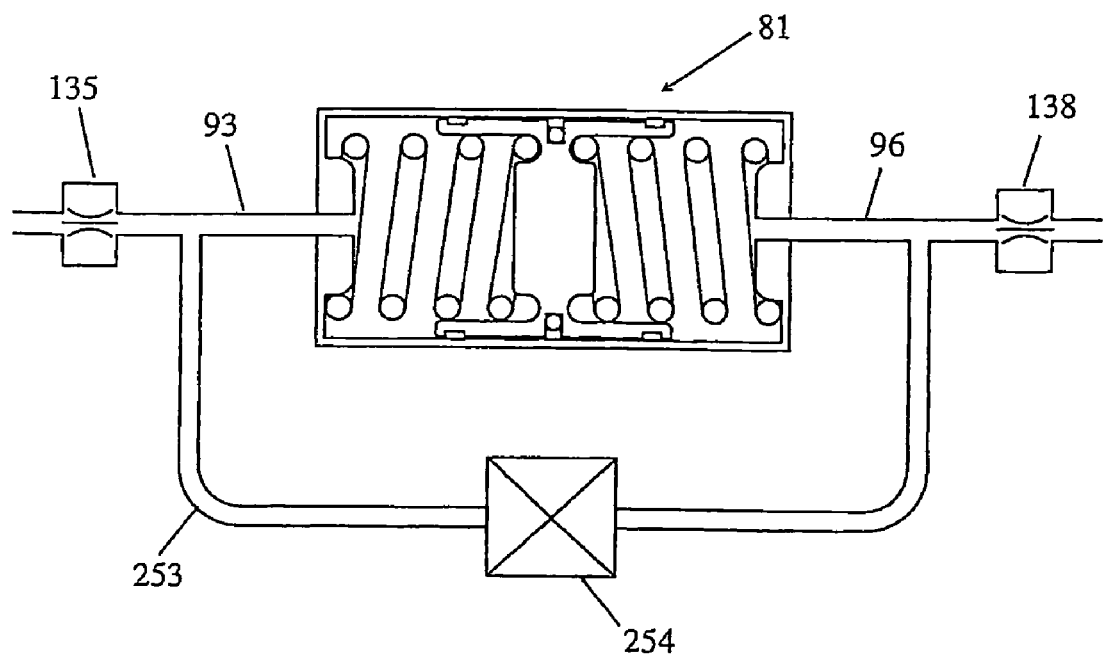
FIG. 8 shows a schematic view of part of a system according to a further preferred embodiment of the present invention showing an alternative arrangement of a bypass passage connected in parallel with only the pitch resilience device.

FIG. 8 illustrates a similar pitch stiffness bypass to FIG. 7, but in this case, the conduit or passage 253 is in parallel with only the pitch resilience device, thereby retaining the pitch damping function of the pitch dampers 135 and 138 even when the lockout valve 254 is open. Again it can be desirable to provide damping through the bypass conduit or passage to further increase the pitch damping (particularly at certain flow rates or frequencies) to suit the reduced pitch stiffness.

There are many modifications envisaged that can be made to the above described hydraulic system, for example to improve packaging or reduce cost.

For example, it is possible to operate any of the arrangements of the hydraulic system with accumulators provided for only two of the compression volumes instead of all four, if no line blocking valves are used. For example, if the roll moment distribution of the hydraulic system is extremely forward biased, then the back wheel rams can be of small diameter. Then the resilience in the pitch resilience devices and the resilience provided by the accumulators on the front compression volumes is sufficient for the system to operate correctly. The pistons of the pitch resilience devices are then displaced in pure heave motions when the rear compression volume accumulators are eliminated.

Figure 9:
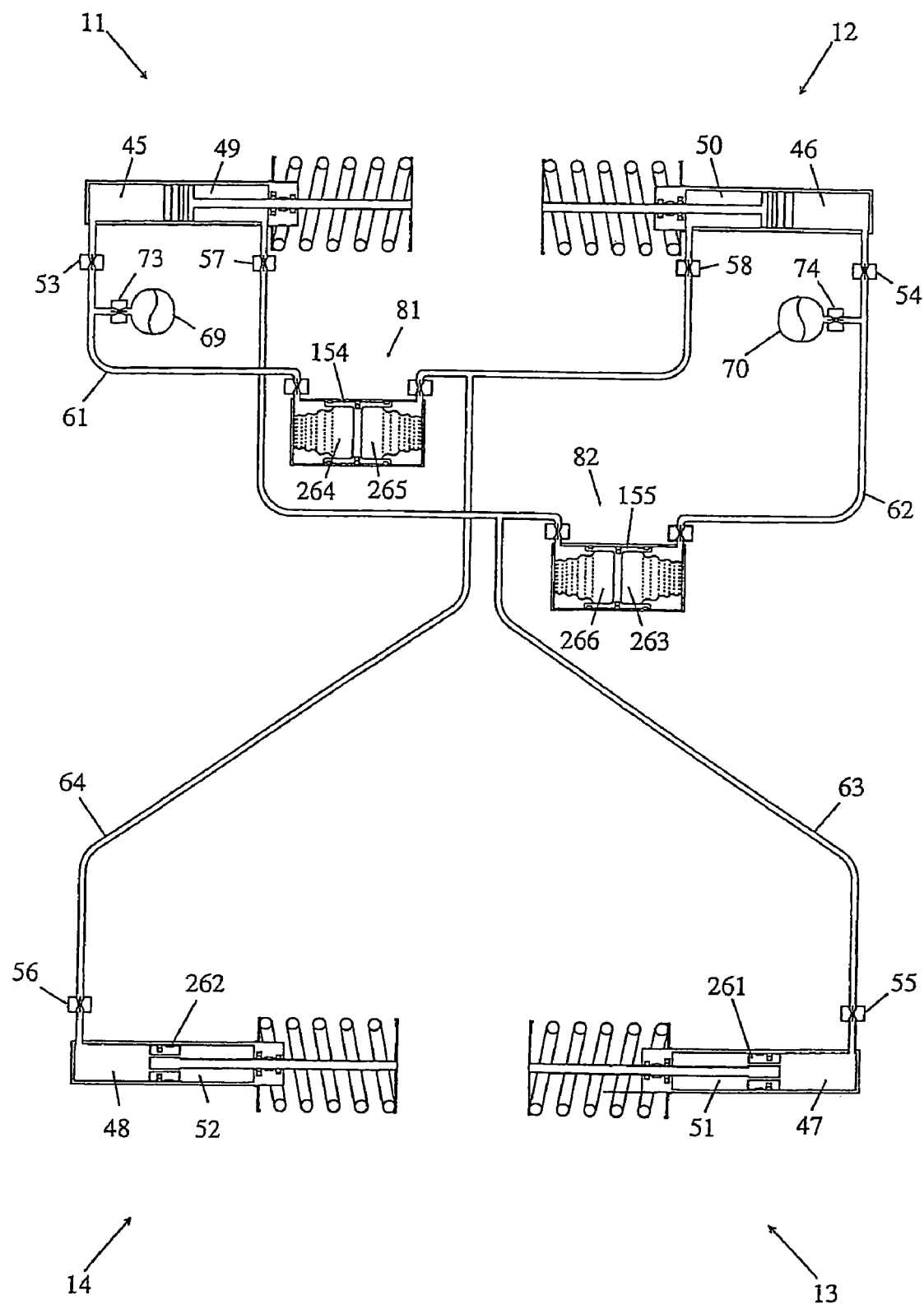
FIG. 9 shows a schematic view of a third possible arrangement of a hydraulic system according to an embodiment of the present invention, showing both a simplified type of pitch resilience device and a modification to provide an extreme roll moment distribution.

Alternatively, as shown in FIG. 9, the wheel rams at one end of the vehicle can be made single-acting to provide a system with an extreme roll moment distribution (again in this case biased towards the front of the vehicle, so the rear rams are made less effective). In this case, the rear wheel rams have their pistons changed to conventional "shock absorber" type pistons 261, 262 incorporating damper valving to provide rebound damping forces in the rear wheel rams. The compression chamber provides compression damping forces through the compression damping valve as before, and it is possible to add additional compression damping at the piston. The rod diameter of the rear wheel ram (along with other geometry induced mechanical advantage effects at the front and rear and other component sizes) determines the roll stiffness forces generated at the rear of the vehicle relative to the front of the vehicle.

As only the rod diameter/volume is displaced from the rear wheel rams as they expand and contract, the system can be designed to provide acceptable dynamic response without the need for rear accumulators, which have been deliberately omitted from FIG. 9.

Alternative forms of resilient means are also shown in the pitch resilience devices in FIG. 9, which are functionally similar to those shown in FIGS. 5 to 8. However, in this case, the resilient members are elastomeric members 263, 264, 265 and 266 which can be profiled (for example, as shown in FIG. 9) to provide control of the stiffness of the resilient member with displacement of the piston.

There are many further alternative forms of resilient means that may be provided in the pitch resilience devices. For example the resilient means may be air spring type devices which can either be sealed or include connections, for example at the ends of the pitch resilience device cylinders, to permit adjustment of the pitch stiffness of the hydraulic system.

Any of the arrangements shown in FIGS. 1 to 6 may be applied to a vehicle with the system rotated through ninety degrees with respect to the vehicle, to thereby provide a higher pitch stiffness than roll stiffness, which can be desirable for vehicles with a high sensitivity to pitch attitude, such as high speed (race) cars utilising aerodynamic aids. The bypass arrangements of FIGS. 7 and 8 can be used to remove the roll stiffness in this case and the alternate forms of resilient means described for FIG. 9 are also applicable. An example of such an arrangement is shown in FIG. 10, with common reference numerals used for parts equivalent to those in previous figures.

Figure 10:
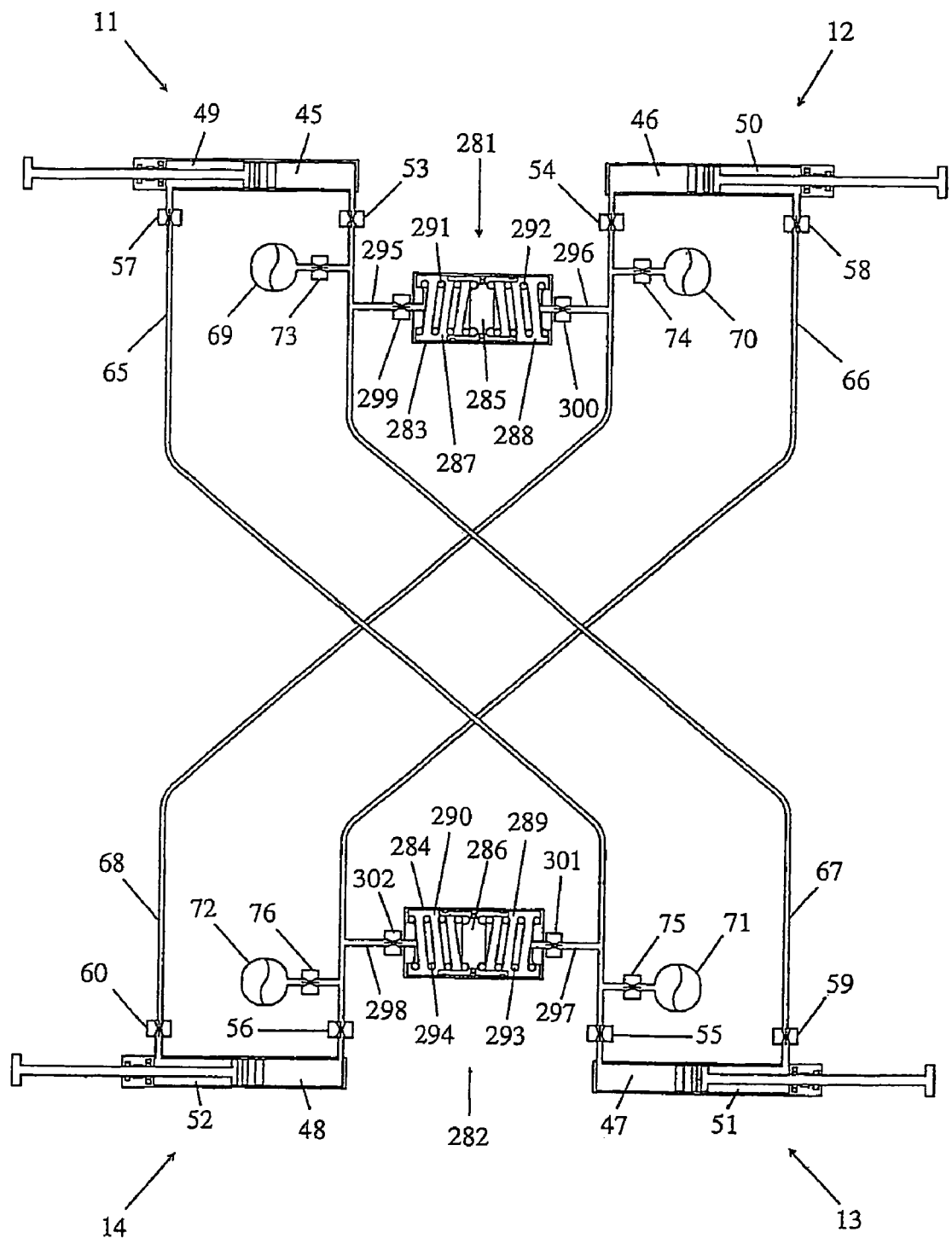
FIG. 10 shows a schematic view of a further arrangement of a hydraulic system according to an embodiment of the present invention, showing a respective pitch resilience device connected between each front left and right pair of compression chambers and between each rear left and right pair of compression chambers.

In FIG. 10 the same base diagonal connection arrangement of first and second diagonal circuits between the wheel rams provides roll and pitch stiffness as described in relation to FIG. 1. Again the first and second diagonal circuits together provide a front left, a front right, a back left and a back right compression volume. Now however there is provided a front roll resilience device 281 and a back roll resilience device 282 which can be of similar construction to any of the previously described pitch resilience devices.

The front roll resilience device 281 includes a cylinder bore 283 (capped at each end to form a primary chamber) and a piston 285 to divide the primary chamber into two secondary roll chambers 287 and 288. A coil spring 291 and 292 is located in each roll chamber to provide resilient axial location of the piston 285. The roll resilience device is connected between the front left compression volume and the front right compression volume by a front left compression roll conduit 295 and a front right compression roll conduit 296. The secondary roll chamber 287 can therefore be referred to as a front left roll chamber and the secondary chamber 288 can be referred to as a front right roll chamber.

The back roll resilience device is shown having a similar construction to the front, so the secondary chamber 289 is a back right roll chamber connected to the back right compression volume through the back right compression roll conduit 297 and the secondary chamber 290 is a back left roll chamber connected to the back left compression volume through the back left compression roll conduit 298.

In pitch, pressures generated by the pitch motion are reacted across the pistons 285 and 296 of the roll resilience devices. For example when braking, the pressure increases in the front left and right compression volumes and decreases in the back left and right compression volumes. The pressure increases in the front volumes are reacted across the piston 285 of the front roll resilience device and the pressure decreases in the back compression volumes are reacted across the piston 286 of the back roll resilience device. Thus for pure pitch motions there is no displacement of the pistons in the roll resilience devices 281 and 282 and no reduction in the pitch stiffness of the hydraulic system which is provided by the base diagonal connection arrangement of first and second diagonal circuits.

In roll, pressure changes generated by the roll motion cause displacement of the pistons 285 and 286 of the front and rear roll resilience devices. For example, when making a right turn, causing the vehicle to roll to the left, the front left and back left compression volumes increase in pressure (due to fluid from the front left compression chamber 45 and the back right rebound chamber 51 entering the front left compression volume accumulator 69, and due to fluid from the back left compression chamber 48 and the front right rebound chamber 50 entering the back left compression volume accumulator 72) and the right compression volume reduces in pressure (due to fluid entering the front right compression chamber 46 and the back left rebound chamber 52 from the front right compression volume accumulator 70, and due to fluid entering the back right compression chamber 47 and the front left rebound chamber 49 from the accumulator 71) thereby providing the necessary roll couple. These changes in pressure act across the pistons of the roll resilience devices, displacing the pistons 285 and 286 which compress the front left and back left compression roll springs 292 and 293 and extend the front right and back right compression roll springs 291 and 294 until equilibrium is found. The displacement of the roll resilience device pistons 285, 286 results in an effective displacement of fluid from the left compression volumes into the right compression volumes and therefore a reduction in the pressure in the hydraulic system in roll. The sizing of the components of the back roll resilience device can be different to those of the front roll resilience device to provide one of several possible methods of changing the roll moment distribution of the hydraulic system.

Roll damper valves 299-302 are shown on each of the roll conduits 295-298 to damp the additional roll resilience provided by the roll resilience devices. As with the pitch damper valves in the previous arrangements, the position, number and style of these roll damper valves can vary from the simple schematic representations in FIG. 10.

There are other alternative forms of modal resilience device that can be incorporated into the hydraulic system between the pair of diagonal circuits to provide additional resilience in the roll or pitch mode. For example, if the two system chambers of each modal resilience device vary in volume in the same direction as each other, as opposed to the opposite direction to each other as in the modal resilience devices shown in FIGS. 1 to 10, then for any given connection arrangement, the modal resilience is added in the roll mode instead of the pitch mode or vice versa. Also, additional heave resilience is provided in this alternative form of modal resilience device.

Figure 11:
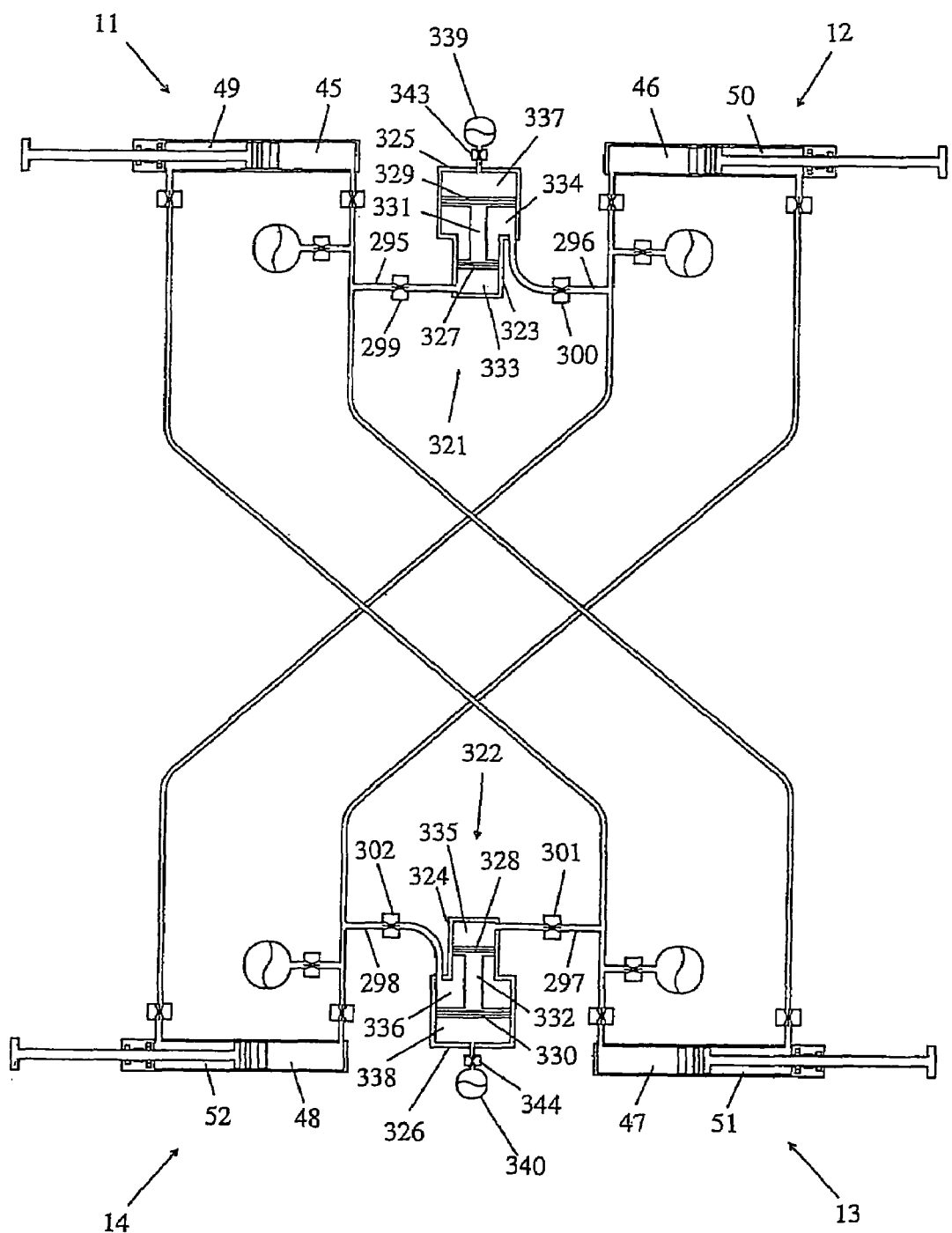
FIG. 11 shows a schematic view of an embodiment similar to the arrangement shown in FIG. 10 though including an alternative form of modal resilience device

One such alternative form of modal resilience device (321 and 322) is shown in FIG. 11 and comprises two axially aligned cylinder portions 323 and 325. In the smaller diameter cylinder portion 323 is a piston 327 forming a front left compression system chamber 333. In the larger diameter cylinder portion 325 is a piston 329, connected to piston 327 by a rod 331, the front right compression system chamber 334 being formed between the two pistons 327 and 329 and having an effective piston area defined by the area of the larger piston 329 minus the area of the smaller piston 327. The piston rod assembly (made up of pistons 327 and 329 and the rod 331) can alternatively be constructed from the piston 329 and a rod of the diameter of the smaller piston 327. A pitch control chamber 337 is also formed by the larger piston 329 in the remainder of the larger cylinder 325. Resilience can be provided in the pitch control chamber by a mechanical spring, a pressurised gas spring or by a fluid pressure accumulator 339 connected to the pitch control chamber 337. An optional pitch damper is shown between the accumulator 339 and the pitch control chamber 337.

In FIG. 11, the conduit connectivity between the modal resilience device and the wheel rams is the same as in FIG. 10. However, the alternative form of modal resilience device is shown substituting the modal resilience devices of FIG. 10, front and rear. In this case, the modal resilience device now adds resilience into the hydraulic system in the pitch mode, so the modal resilience device 321 is a front pitch resilience device and the modal resilience device 322 is a back pitch resilience device. At the front, the dampers 299 and 300 are now pitch dampers and can be deleted in favour of the pitch damper 343 and similarly at the rear, to use modal pitch damping, only the two dampers 301 and 302 or the single pitch damper 344 is required.

In pitch, for example when braking, looking at the front pitch resilience device, fluid is displaced from the two front compression circuits into the front left compression and front right compression system chambers (333 and 334) of the front pitch resilience device, displacing the piston rod assembly and causing the volume of the front pitch control chamber 337 to be reduced.

In roll, for example when turning to the right, again looking at the operation of the front pitch resilience device 321, the increase in fluid pressure generated in the front left compression volume and the decrease in fluid pressure generated in the front right compression volume are reacted by the piston rod assembly.

In heave, a small quantity of fluid (relative to that displaced in the roll and pitch modes) is displaced out of each compression volume into the front and rear pitch resilience devices 321 and 322, causing a small displacement of the piston rod assembly of each device. This construction of modal resilience device therefore also adds further heave resilience into the hydraulic system.

It will be appreciated that the additional features such as pressure maintenance and switchable bypass passages which are described earlier can be applied to the invention shown in FIG. 11. For example the system chambers 333 and 334 of the front pitch resilience device 321 in FIG. 11 can be selectively interconnected through a switchable bypass passage to remove the roll stiffness of the hydraulic system, and/or the pitch resilience chambers 337 and 338 of the two pitch resilience devices 321 and 322 can be interconnected through a passage including a controllable valve to remove the pitch stiffness of the hydraulic system.

Figure 12:
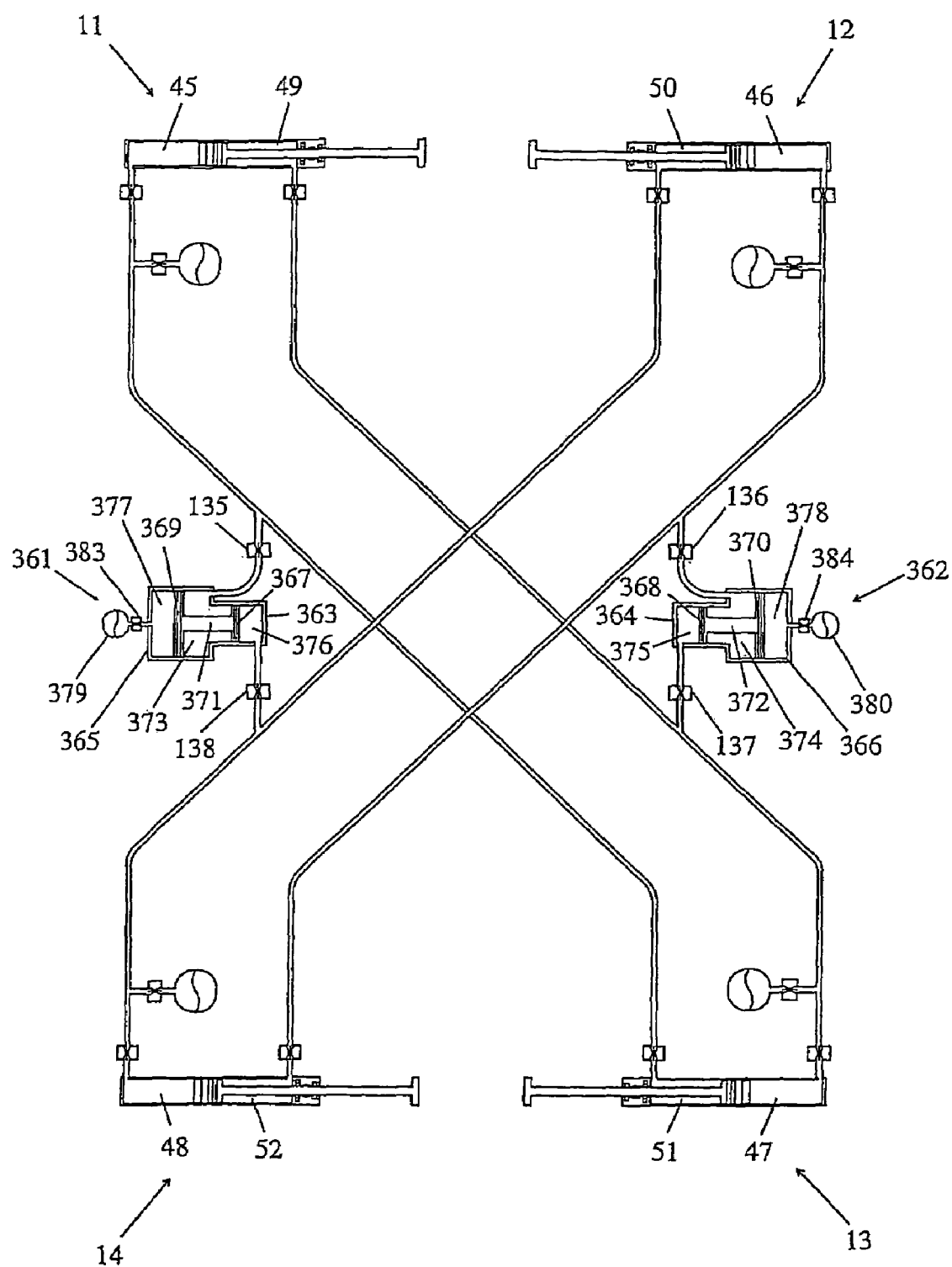
FIG. 12 shows the modal resilience devices of FIG. 11 connected into the hydraulic system of an embodiment of the present invention with the same conduit connectivity as in FIGS. 1 to 4.

In FIG. 12, the modal resilience device of FIG. 11 is shown connected into the hydraulic system with the same conduit connectivity as in FIGS. 1 to 4, the modal resilience device now adding resilience in the roll mode. Thus the modal resilience device 361 is a left roll resilience device having a front left compression system chamber 373 connected to and forming part of the front left compression volume and a back left compression system chamber 376 connected to and forming part of the back left compression volume, and a left roll control chamber 377.

In pitch, for example when braking, looking at the operation of the left roll resilience device 361, the increase in fluid pressure generated in the front left compression volume and the decrease in fluid pressure generated in the back left compression volume are reacted by the piston rod assembly.

In roll, for example when turning to the right, again looking at the operation of the left roll resilience device, fluid is displaced from the two left compression volumes into the front left compression and back left compression system chambers (373 and 376), displacing the piston rod assembly and causing the volume of the left roll control chamber 377 to be reduced. This provides an increase in pressure in the two left compression volumes. Similarly, the volume of the right roll control chamber 378 is increased, providing a reduction in pressure in the two right compression volumes, thereby providing a roll couple.

Either the two dampers 135 and 138 or the roll damper 383 can be used to damp the additional roll resilience provided by device 361 if required.

In heave, a small quantity of fluid (relative to that displaced in the roll and pitch modes) is displaced out of each compression volume into the left and right roll resilience devices 361 and 362, causing a small displacement of the piston rod assembly of each device. This construction of modal resilience device therefore also adds further heave resilience into the hydraulic system.

It will be appreciated that the additional features such as pressure maintenance and switchable bypass passages which are described earlier can be applied to the invention shown in FIG. 12. For example the system chambers 373 and 376 of the left roll resilience device 361 in FIG. 12 can be selectively interconnected through a switchable bypass passage to reduce or remove the pitch stiffness of the suspension system, and/or the roll resilience chambers 377 and 378 of the two roll resilience devices 361 and 362 can be interconnected through a passage including a controllable valve to reduce or remove the roll stiffness of the suspension system.

For the configurations of modal resilience device and connection sequence shown in FIGS. 11 and 12, the wheel rams at one end of the vehicle may be single-acting as shown in FIG. 9, and the surplus rebound conduits deleted. This can be desirable, for example to provide acceptable component sizes when the roll moment distribution required from the hydraulic system is particularly unbalanced front to rear.

There are a variety of constructions of the modal resilience device that are similar in function to the embodiment shown in FIGS. 11 and 12.

Figure 13:
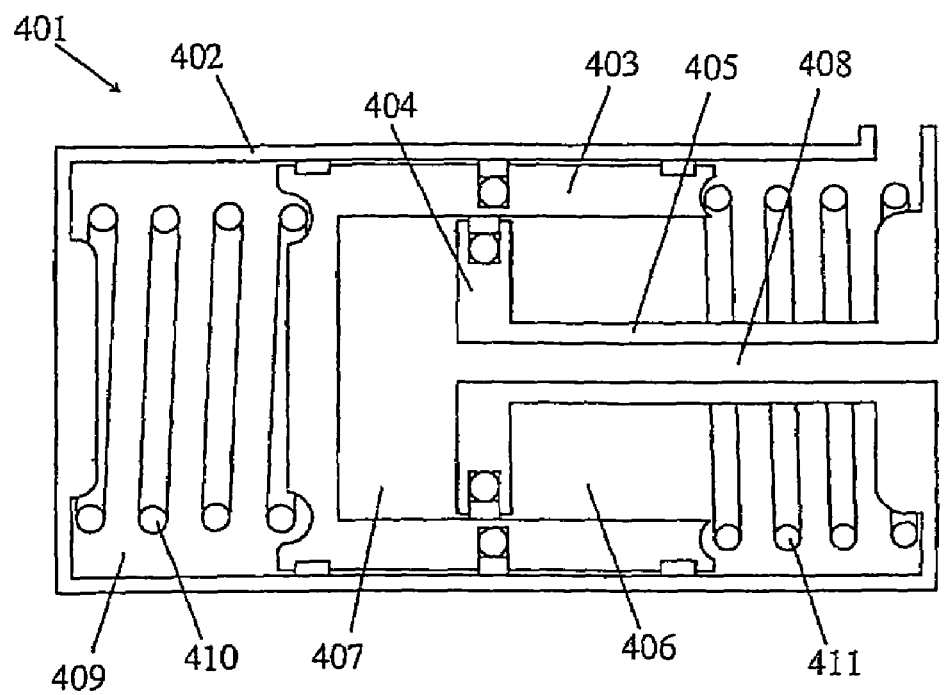
FIG. 13 shows an alternative form of modal resilience device applicable to embodiments of the present invention.

FIG. 13 shows one such alternative construction of modal resilience device 401. Inside an outer cylinder 402 is provided a floating piston 403 and a fixed piston 404. The fixed piston 404 is rigidly attached to one end of the outer cylinder 402 by a rod 405. The first system chamber 406 is formed between the outer cylinder 402 and the fixed piston 404 by the floating piston 403. The effective piston area of the first system chamber being the difference between the area of the outer cylinder bore and the area of the floating piston bore. The second system chamber 407 is formed between the floating piston 403 and the fixed piston 404 and has an effective piston area defined by the diameter of the bore inside the floating piston. The second system chamber communicates with the hydraulic system through a conduit 408 formed inside the rod. The modal resilience chamber 409 is formed between the cylinder 402 and the floating piston 403. The modal resilience is provided by a spring 410 in the modal resilience chamber, although the modal resilience chamber may alternatively or additionally be filled with pressurised gas to provide a spring function. Alternatively the modal resilience chamber may be filled with fluid and be in fluid communication with a fluid pressure accumulator via an optional damper. Optionally, an additional spring 411 may be provided in the first system chamber also. If two coil springs (or similar linear or non-linear resilient means) are used as shown in FIG. 13, then the preload on the springs can be used to give a high stiffness on centre, with a lower stiffness once one of the springs reaches its free length. Combined with the use of non-linear resilient means such as items similar to conventional vehicle bump-stops, this can provide a wide range of options in tuning the operation of the unit within the hydraulic system and therefore the ride of the vehicle.

Figure 14:
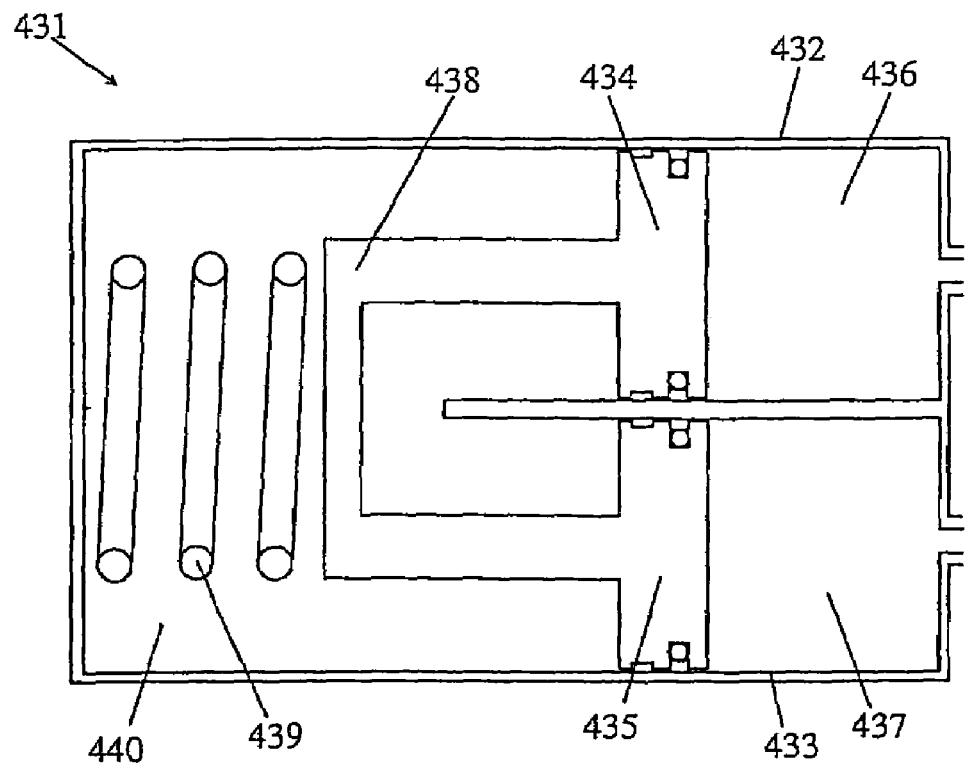
FIG. 14 shows a further alternative form of modal resilience device applicable to embodiments of the present invention.

A further alternative construction of modal resilience device 431 is shown in FIG. 14, with similar function to the modal resilience devices in FIGS. 12 to 14. Two cylinders 432 and 433 are arranged side by side and a piston (434, 435) is provided in each cylinder to form the first system chamber 436 and the second system chamber 437. The two pistons are rigidly joined together by a member 438 upon which a resilient means 439 acts. The resilient means may be a coil spring as shown, or any other form of mechanical spring. Alternatively the cavity (or modal resilience chamber) 440 may be filled with pressurised gas, or the member may include a further piston to operate in a single-acting cylinder. The single acting cylinder can be filled with gas to act as a spring, or with fluid which displaces into a fluid pressure accumulator via an optional damper valve. The piston may be sealed by a diaphragm, with the resilient means being similar in construction to a vehicle support air spring.

Figure 15:
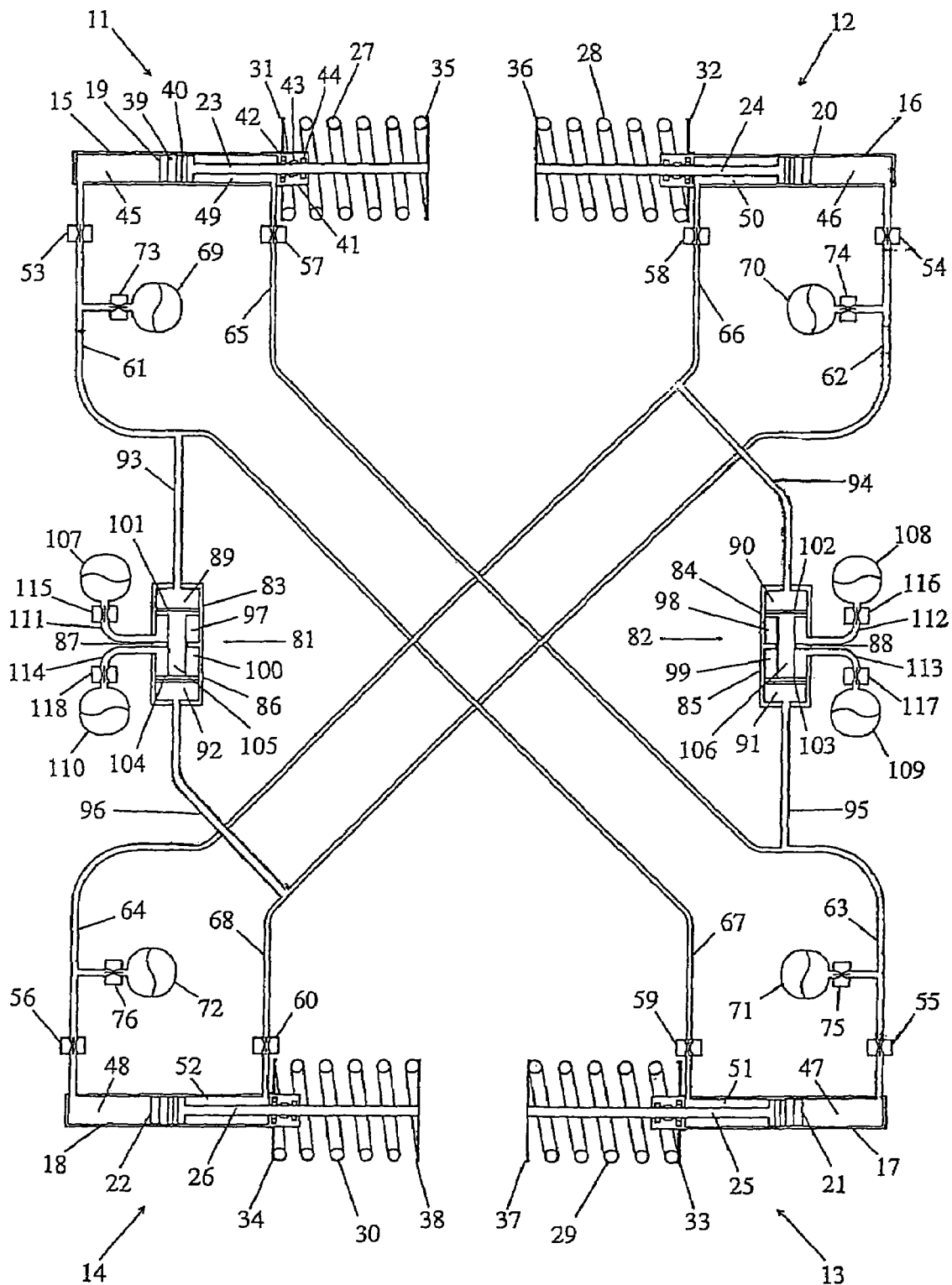
FIG. 15 shows a schematic view similar to FIG. 1 but the fluid conduits have been repositioned in FIG. 15.

A further alternative construction of the hydraulic system is illustrated in FIG. 15. FIG. 15 is the same as FIG. 1 except that conduit 96 is attached between conduits 68 and 62 rather than between conduits 64 and 66 and conduit 94 is attached between conduits 64 and 66 rather than between 62 and 68. This provides for the first diagonal first compression volume and the second diagonal first compression volume including compression chambers of wheel rams at the same side of the vehicle.

There are a variety of methods for positioning double-acting wheel rams on vehicles and arrangements of ports for the two fluid volumes, with the fluid from at least one of the chambers being passed through the rod of the wheel ram or passed around the cylinder of the wheel ram to provide a range of possible points for the fluid connection of the wheel ram to the rest of the vehicle hydraulic system.

As described for FIG. 1, at every point in any figure where there is a restriction symbol used to indicate a damper valve, that damper valve can be either: a single damper valve having the same characteristics in both directions; a single valve having different characteristics from one direction of fluid flow to the other; a single valve having flow restriction characteristics in one direction and being relatively free-flowing in the opposite direction; two single-acting valves, one damper valve to control the restriction to flow in one direction and a second damper valve to control the restriction to flow in the opposite direction, the two valves being used in parallel, or in series with a non-return valve in parallel with each valve as is known in conventional damper valve technology.

Many other alterations to the basic arrangement of the components are envisaged whilst maintaining the connection sequence essential for the functionality of the hydraulic system are considered to fall within the scope of the invention described in this application, as are any combinations of features disclosed in the above description. For example, it will be appreciated that, in a production design of the system of the present invention, it is possible to incorporate not only the wheel damper valves (53-60) into the main body of the wheel ram, but also the accumulators with their damper valves and even the pitch resilience devices with their damper valves.

The invention claimed is:

1. A hydraulic system for a suspension system for a vehicle, the vehicle including a vehicle body and at least one forward pair of wheel assemblies and at least one rearward pair of wheel assemblies,
the hydraulic system including: at least one first pair of wheel rams at a first end of the vehicle, each ram thereof including a compression chamber and a rebound chamber, and at least one second pair of wheel rams at a second end of the vehicle, each ram thereof including a compression chamber and a rebound chamber; and wherein the system includes first and second diagonal circuits with respect to said vehicle,
the first diagonal circuit interconnecting a first left wheel ram and a second right wheel ram, the compression chamber of each wheel ram being in fluid communication with the rebound chamber of the other wheel ram forming first and second fluid volumes of the first diagonal circuit:
the second diagonal circuit interconnecting a first right wheel ram and a second left wheel ram, the compression chamber of each wheel ram being in fluid communication with the rebound chamber of the other wheel ram forming first and second fluid volumes of the second diagonal circuit;
and wherein the hydraulic system includes at least one first modal resilience device and at least one second modal resilience device, the at least one second modal resilience device being separate from the at least one first modal resilience device;
the first and second modal resilience devices each including at least one resilient means, at least one moveable member and at least first and second system modal chambers,
wherein the first modal resilience device has the first system modal chamber thereof connected in fluid communication with the first fluid volume of the first diagonal circuit forming a first diagonal first compression volume, the second system modal chamber thereof connected in fluid communication with the second fluid volume of the second diagonal circuit forming a second diagonal second compression volume,
and the second modal resilience device has the first system modal chamber thereof connected in fluid communication with the first fluid volume of the second diagonal circuit forming a second diagonal first compression volume, and the second system modal chamber thereof connected in fluid communication with the second fluid volume of the first diagonal circuit forming a first diagonal second compression volume; and
wherein motion of the moveable member of each modal resilience device due to roll or pitch motion of the vehicle is controlled by the respective at least one resilient means to thereby provide respective roll or pitch resilience in the system.

2. A hydraulic system as claimed in claim 1, wherein
the volume of the first and second system modal chambers of at least one of said first and second modal resilience devices vary with motion of the respective moveable member(s), said motion deforming, compressing or extending said at least one resilient means;
and wherein motion of the at least one moveable member of the first modal resilience device against the at least one modal resilience means thereof permits effective fluid flow from the first diagonal first compression volume and simultaneously permits effective fluid flow either to or from the second diagonal second compression volume;
and wherein motion of the at least one moveable member of the second modal resilience device against the at least one modal resilience means thereof permits effective fluid flow from the second diagonal first compression volume and simultaneously permits effective fluid flow either to or from the first diagonal second compression volume,
the modal resilience means of each of the modal resilience devices thereby providing controlled increased resilience during either the roll or pitch motions of the vehicle.

3. A hydraulic system as claimed in claim 2, wherein for each modal resilience device, the volume of the first system modal chamber varies in volume in the opposite direction to the volume of the second system modal chamber thereof with motion of the at least one moveable member to thereby permit controlled effective fluid flow between the associated first and second compression volumes.

4. A hydraulic system as claimed in claim 2, wherein for each modal resilience device, the volume of the first system modal chamber varies in volume in the same direction as the volume of the second system modal chamber thereof with motion of the at least one moveable member to thereby permit controlled simultaneous effective fluid flow out of both or into both of the associated first and second compression volumes.

5. A hydraulic system as claimed in claim 1, wherein for each modal resilience device, the volume of the first system modal chamber varies in volume in the opposite direction to the volume of the second system modal chamber thereof with motion of the at least one moveable member to thereby permit controlled effective fluid flow between the associated first and second compression volumes.

6. A hydraulic system as claimed in claim 5, wherein the first diagonal first compression volume and the second diagonal first compression volume include compression chambers of wheel rams at the same end of the vehicle, the modal resilience device thereby connected to provide additional pitch resilience to the hydraulic system.

7. A hydraulic system as claimed in claim 1, wherein for each modal resilience device, the volume of the first system modal chamber varies in volume in the same direction as the volume of the second system modal chamber thereof with motion of the at least one moveable member to thereby permit controlled simultaneous effective fluid flow out of both or into both of the associated first and second compression volumes.

8. A hydraulic system as claimed in claim 7, wherein the first diagonal first compression volume and the second diagonal first compression volume include compression chambers of wheel rams at the same end of the vehicle, the modal resilience device thereby connected to provide additional roll resilience to the hydraulic system.

9. A hydraulic system for a suspension system for a vehicle, the vehicle including a vehicle body and at least one forward pair of wheel assemblies and at least one rearward pair of wheel assemblies, the hydraulic system including: at least one first pair of wheel rams at a first end of the vehicle, each ram thereof including a compression chamber and a rebound chamber, and at least one second pair of wheel rams at a second end of the vehicle, each ram thereof including a compression chamber and a rebound chamber; and wherein the system includes first and second diagonal circuits with respect to said vehicle, the first diagonal circuit interconnecting a first left wheel ram and a second right wheel ram, the compression chamber of each wheel ram being in fluid communication with the rebound chamber of the other wheel ram forming first and second fluid volumes of the first diagonal circuit:

the second diagonal circuit interconnecting a first right wheel ram and a second left wheel ram, the compression chamber of each wheel ram being in fluid communication with the rebound chamber of the other wheel ram forming first and second fluid volumes of the second diagonal circuit wherein;

the hydraulic system includes at least one first modal resilience device and at least one second modal resilience device;

the first and second modal resilience devices each including at least one resilient means, at least one moveable member and at least first and second system modal chambers;

the first modal resilience device has the first system modal chamber thereof connected in fluid communication with the first fluid volume of the first diagonal circuit forming a first diagonal first compression volume, the second system modal chamber thereof connected in fluid communication with the second fluid volume of the second diagonal circuit forming a second diagonal second compression volume;

the second modal resilience device has the first system modal chamber thereof connected in fluid communication with the first fluid volume of the second diagonal circuit forming a second diagonal first compression volume, and the second system modal chamber thereof connected in fluid communication with the second fluid volume of the first diagonal circuit forming a first diagonal second compression volume;

motion of the moveable member of each modal resilience device due to roll or pitch motion of the vehicle is controlled by the respective at least one resilient means to thereby provide respective roll or pitch resilience in the system;

for each modal resilience device, the volume of the first system modal chamber varies in volume in the opposite direction to the volume of the second system modal chamber thereof with motion of the at least one moveable member to thereby permit controlled effective fluid flow between the associated first and second compression volumes; and the first diagonal first compression volume and the second diagonal first compression volume include compression chambers of wheel rams at the same side of the vehicle, the modal resilience device thereby connected to provide additional roll resilience to the hydraulic system.

10. A hydraulic system for a suspension system for a vehicle, the vehicle including a vehicle body and at least one forward pair of wheel assemblies and at least one rearward pair of wheel assemblies, the hydraulic system including: at least one first pair of wheel rams at a first end of the vehicle, each ram thereof including a compression chamber and a rebound chamber, and at least one second pair of wheel rams at a second end of the vehicle, each ram thereof including a compression chamber and a rebound chamber; and wherein the system includes first and second diagonal circuits with respect to said vehicle, the first diagonal circuit interconnecting a first left wheel ram and a second right wheel ram, the compression chamber of each wheel ram being in fluid communication with the rebound chamber of the other wheel ram forming first and second fluid volumes of the first diagonal circuit:

the second diagonal circuit interconnecting a first right wheel ram and a second left wheel ram, the compression chamber of each wheel ram being in fluid communication with the rebound chamber of the other wheel ram forming first and second fluid volumes of the second diagonal circuit wherein;

the hydraulic system includes at least one first modal resilience device and at least one second modal resilience device;

the first and second modal resilience devices each including at least one resilient means, at least one moveable member and at least first and second system modal chambers;

the first modal resilience device has the first system modal chamber thereof connected in fluid communication with the first fluid volume of the first diagonal circuit forming a first diagonal first compression volume, the second system modal chamber thereof connected in fluid communication with the second fluid volume of the second diagonal circuit forming a second diagonal second compression volume;

the second modal resilience device has the first system modal chamber thereof connected in fluid communication with the first fluid volume of the second diagonal circuit forming a second diagonal first compression volume, and the second system modal chamber thereof connected in fluid communication with the second fluid volume of the first diagonal circuit forming a first diagonal second compression volume;

motion of the moveable member of each modal resilience device due to roll or pitch motion of the vehicle is controlled by the respective at least one resilient means to thereby provide respective roll or pitch resilience in the system;

for each modal resilience device, the volume of the first system modal chamber varies in volume in the same direction as the volume of the second system modal chamber thereof with motion of the at least one moveable member to thereby permit controlled simultaneous effective fluid flow out of both or into both of the associated first and second compression volumes; and the first diagonal first compression volume and the second diagonal first compression volume include compression chambers of wheel rams on the same side of the vehicle, the modal resilience device thereby connected to provide additional pitch resilience to the hydraulic system.

11. A hydraulic system for a suspension system for a vehicle, the vehicle including a vehicle body and at least one forward pair of wheel assemblies and at least one rearward pair of wheel assemblies, the suspension system including front and rear resilient vehicle support means between the vehicle body and the wheel assemblies for resiliently supporting the vehicle above the wheel assemblies, the hydraulic system including: at least one first pair of wheel rams at a first end of the vehicle and at least one second pair of wheel rams at a second end of the vehicle; each of the at least one first pair of wheel rams at a first end of the vehicle including a compression chamber and a rebound chamber, thereby providing a first left compression chamber, a first left rebound chamber, a first right compression chamber and a first right rebound chamber; each of the at least one second pair of wheel rams including a compression chamber, thereby providing a second left compression chamber and a second right compression chamber; the first left rebound chamber being connected to the second right compression chamber and the first right rebound chamber being connected to the second left compression chamber; and wherein there is provided at least a first and a second pitch resilience device, the second pitch resilience device being separate from the first pitch resilience device, each pitch resilience device including at least two pitch chambers and a moveable member, wherein motion of the moveable member is controlled by at least one resilient device, the two pitch chambers varying in volume inversely proportionally to each other with movement of the moveable member, the first pitch resilience device including a first left compression pitch chamber and a second left compression pitch chamber, the second pitch resilience device including a first right compression pitch chamber and a second right compression pitch chamber; the first left compression chamber being in fluid communication with the first left compression pitch chamber forming a first left compression volume, the second left compression chamber being in fluid communication with the second left compression pitch chamber, together with the first right rebound chamber forming a second left compression volume, the first right compression chamber being in fluid communication with the first right compression pitch chamber forming a first right compression volume, the second right compression chamber being in fluid communication with the second right compression pitch chamber, together with the first left rebound chamber forming a second right compression volume, such that suspension parameters provided by the hydraulic system can be independently tuned from each other.

* * * * *